(12) United States Patent
Setoguchi et al.

(10) Patent No.: US 10,396,376 B2
(45) Date of Patent: Aug. 27, 2019

(54) FUEL CELL VEHICLE CONTROL METHOD AND FUEL CELL VEHICLE CONTROL APPARATUS

(71) Applicant: NISSAN MOTOR CO., LTD., Yokohama-shi, Kanagawa (JP)

(72) Inventors: Hideaki Setoguchi, Kanagawa (JP); Mitsunori Kumada, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/765,818

(22) PCT Filed: Oct. 5, 2015

(86) PCT No.: PCT/JP2015/078244
§ 371 (c)(1),
(2) Date: Apr. 4, 2018

(87) PCT Pub. No.: WO2017/060960
PCT Pub. Date: Apr. 13, 2017

(65) Prior Publication Data
US 2018/0294492 A1    Oct. 11, 2018

(51) Int. Cl.
*H01M 8/0438* (2016.01)
*H01M 8/04* (2016.01)
(Continued)

(52) U.S. Cl.
CPC ......... *H01M 8/04425* (2013.01); *B60L 50/50* (2019.02); *H01M 4/86* (2013.01);
(Continued)

(58) Field of Classification Search
CPC ........... H01M 8/04425; H01M 8/1004; H01M 8/1027; H01M 8/1039; H01M 8/1034; H01M 8/1018; H01M 8/10; H01M 8/02; H01M 4/8828; H01M 4/9075; H01M 4/925; H01M 4/9083; H01M 4/926; H01M 4/86; H01M 4/88; H01M 2300/0082; H01M 2004/8689; H01M 2250/20;
(Continued)

(56) References Cited

U.S. PATENT DOCUMENTS

2005/0103544 A1    5/2005  Takami et al.
2015/0357659 A1*  12/2015  Okui ................. B60L 3/0053
                                              429/432
2017/0274902 A1    9/2017  Kumada et al.

FOREIGN PATENT DOCUMENTS

JP    2005-044531 A    2/2005
JP    2005-096574 A    4/2005
(Continued)

*Primary Examiner* — Milton I Cano
*Assistant Examiner* — Philip A. Stuckey
(74) *Attorney, Agent, or Firm* — Foley & Lardner LLP

(57) ABSTRACT

A fuel cell vehicle control method changes an output current of a fuel cell depending on a required generated power and adjusts an air supply flow rate depending on the change of the output current. The output current is reduced in response to a decrease of the required generated power when a gearshift operation of a transmission is under an inertia phase of an upshift operation. The air supply flow rate is controlled to an inertia phase supply flow rate higher than the air supply flow rate set in response to the decrease of the output current.

8 Claims, 27 Drawing Sheets

(51) Int. Cl.
    *H01M 4/86*         (2006.01)
    *H01M 8/04537*    (2016.01)
    *H01M 8/04746*    (2016.01)
    *H01M 8/24*        (2016.01)
    *B60L 50/50*      (2019.01)

(52) U.S. Cl.
    CPC ......... *H01M 8/04* (2013.01); *H01M 8/04559* (2013.01); *H01M 8/04776* (2013.01); *H01M 8/24* (2013.01); *H01M 2004/8684* (2013.01); *H01M 2004/8689* (2013.01); *H01M 2220/20* (2013.01); *Y02T 10/7005* (2013.01)

(58) Field of Classification Search
    CPC .... H01M 2008/1095; H01M 2008/128; Y02E 60/521; Y02T 90/32; Y02P 70/56
    See application file for complete search history.

(56) References Cited

FOREIGN PATENT DOCUMENTS

| | | |
|---|---|---|
| JP | 2008-154387 A | 7/2008 |
| JP | 2010-192292 A | 9/2010 |
| JP | 2013-062097 A | 4/2013 |
| WO | WO 2016/038689 A1 | 3/2016 |

\* cited by examiner

FUEL CELL VEHICLE CONTROL METHOD AND FUEL CELL VEHICLE CONTROL APPARATUS

TECHNICAL FIELD

The present invention relates to a fuel cell vehicle control method and a fuel cell vehicle control apparatus.

BACKGROUND ART

A control device of the prior art for controlling a vehicle having a fuel cell, a motor, and a transmission is discussed in JP2008-154387A, in which a motor torque decreases to be lower than a torque requested by a driver by controlling electric energy supplied to the motor during a transmission upshift operation. In this control device, output of the fuel cell is controlled depending on electric power required in the motor during an upshift operation.

SUMMARY OF INVENTION

In the vehicle control device of the prior art described above, the amount of air supplied to the stack is controlled depending on a decrease of the fuel cell output during the upshift operation. However, a pneumatic system such as a compressor that supplies air to the fuel cell has unsatisfactory responsiveness. Therefore, even when a target value of the stack supply flow rate is reduced depending on a decrease of a target value of the output power of the fuel cell during the upshift operation, the output of the compressor is reduced in practice, and a delay occurs until the flow rate supplied to the stack decreases. As a result, a gearshift time is delayed.

In view of the aforementioned problems, it is therefore an object of the present invention to provide a fuel cell vehicle control method and a fuel cell vehicle control apparatus capable of suppressing a delay of the gearshift time during the upshift operation.

According to an aspect of the invention, a fuel cell vehicle control method is provided, the method being executed in a fuel cell vehicle having a fuel cell, an air supply device that supplies air to the fuel cell, a drive motor that drives a fuel cell vehicle using power from the fuel cell, and a transmission provided in a power transmission path between the drive motor and drive wheels. The method includes changing an output current depending on a required generated power of the fuel cell and adjusting an air supply flow rate of the air supply device depending on the change of the output current. The method includes reducing the output current in response to a decrease of the required generated power of the fuel cell when a gearshift operation of the transmission is under an inertia phase of an upshift operation, and controlling the air supply flow rate to an inertia phase supply flow rate higher than the air supply flow rate set in response to the decrease of the output current.

DESCRIPTION OF EMBODIMENTS

Embodiments of the present invention will now be described with reference to the accompanying drawings.
First Embodiment A fuel cell 10 includes an anode (fuel electrode), a cathode (oxidant electrode), and an electrolyte membrane interposed therebetween. In the fuel cell 10, an anode gas (fuel gas) containing hydrogen is supplied to the anode, and a cathode gas (air) containing oxygen is supplied to the cathode, so that electricity is generated. An electrode reaction generated in both the anode and the cathode can be expressed as follows.

Anode: $2H_2 \rightarrow 4H^+ + 4e^-$ (1)

Cathode: $4H^+ + 4e^- + O_2 \rightarrow 2H_2O$ (2)

The electrode reactions expressed in the formulas (1) and (2) generates an electromotive force of approximately 1 V in the fuel cell 10

When the fuel cell 10 is used as a power source of the vehicle, a fuel cell stack 110 obtained by stacking several hundreds of fuel cells is employed because necessary power is high. In addition, a fuel cell system 100 is formed to supply the anode gas and the cathode gas to the fuel cell stack 110 to obtain power for driving the vehicle.

Figure 1:
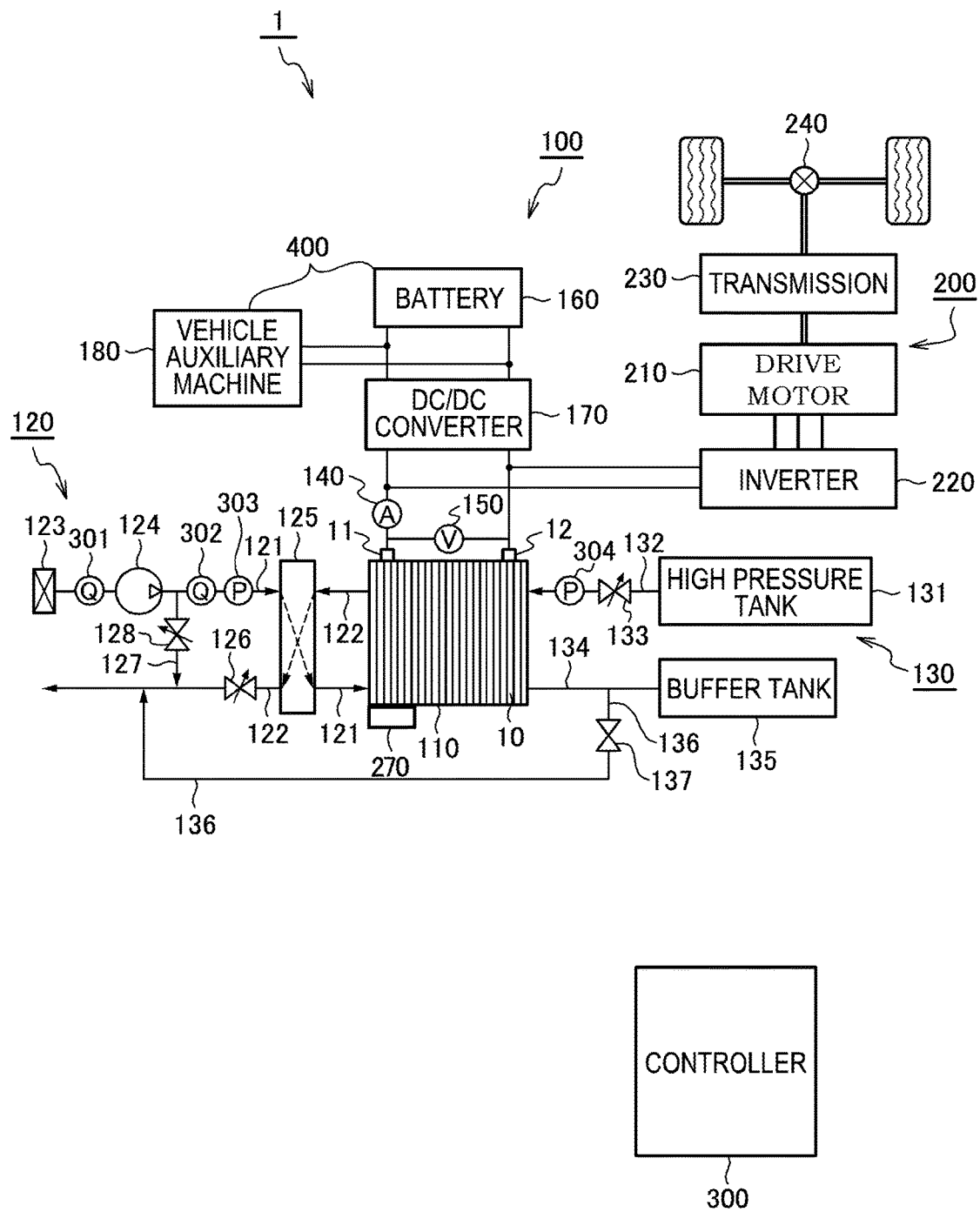
FIG. 1 is a schematic block diagram illustrating a vehicle according to a first embodiment of the invention.

FIG. 1 is a schematic diagram illustrating a vehicle 1 according to a first embodiment of the invention.

The vehicle 1 has a fuel cell system 100, a drive system 200, and a controller 300.

The fuel cell system 100 includes a fuel cell stack 110, a cathode gas supplying/discharging device 120, an anode gas supplying/discharging device 130, a current sensor 140, a voltage sensor 150, a battery 160, a DC/DC converter 170, and vehicle auxiliary machinery 180.

The fuel cell stack 110 is formed by stacking a plurality of fuel cells 10 and is supplied with the anode gas and the cathode gas to generate power necessary to drive the vehicle 1. The fuel cell stack 110 has an anode-side output terminal 11 and a cathode-side output terminal 12 for extracting electric power.

The cathode gas supply/discharge device 120 supplies the cathode gas (air) to the fuel cell stack 110 and discharges a cathode off-gas from the fuel cell stack 110 to the outside. The cathode gas supply/discharge device 120 includes a cathode gas supply passage 121, a cathode gas discharge passage 122, a filter 123, a compressor 124, a water recovery device (hereinafter, also referred to as "WRD") 125, a cathode pressure control value 126, a bypass passage 127, a bypass valve 128, a first air flow sensor 301, a second air flow sensor 302, and a cathode pressure sensor 303.

The cathode gas supply passage 121 is a passage through which the air supplied to the fuel cell stack 110 flows. The cathode gas supply passage 121 has one end connected to the filter 123 and the other end connected to a cathode gas inlet port of the fuel cell stack 110.

The cathode gas discharge passage 122 is a passage through which the cathode off-gas discharged from the fuel cell stack 110 flows. The cathode gas discharge passage 122 has one end connected to a cathode gas outlet port of the fuel cell stack 110 and the other end formed as an opening end. The cathode off-gas is a gas mixture containing oxygen not used in the electrode reaction, nitrogen contained in the cathode gas, and steam generated from the electrode reaction and the like.

The filter 123 removes a foreign substance in the air flowing into the cathode gas supply passage 121.

The compressor 124 is provided in the cathode gas supply passage 121. The compressor 124 supplies the air received by the cathode gas supply passage 121 through the filter 123 to the fuel cell stack 110. Note that the output of the compressor 124 is controlled by the controller 300.

The WRD 125 is connected to each of the cathode gas supply passage 121 and the cathode gas discharge passage 122 to recover moisture in the cathode off-gas flowing through the cathode gas discharge passage 122 and humidify the air flowing through the cathode gas supply passage 121 using the recovered moisture. Note that an intercooler for cooling the air may be provided in the cathode gas supply passage 121 between the compressor 124 and the WRD 125.

The cathode pressure control valve 126 is provided in the cathode gas discharge passage 122 in the downstream of the WRD 125. The open/close operation of the cathode pressure control valve 126 is controlled by the controller 300 to adjust a pressure of the air supplied to the fuel cell stack 110 to a desired pressure. Alternatively, an aperture such as an orifice may be provided instead of the cathode pressure control valve 126.

The bypass passage 127 is a passage provided to discharge a part of the air output from the compressor 124 directly to the cathode gas discharge passage 122 without passing through the fuel cell stack 110 as necessary. The bypass passage 127 has one end connected to the cathode gas supply passage 121 between the compressor 124 and the WRD 125 and the other end connected to the cathode gas discharge passage 122 in the downstream of the cathode pressure control valve 126.

The bypass valve 128 is provided in the bypass passage 127. The open/close operation of the bypass valve 128 is controlled by the controller 300 to adjust the flow rate of the air flowing through the bypass passage 127 (hereinafter, also referred to as a "bypass flow rate").

The first air flow sensor 301 is provided in the cathode gas supply passage 121 in the upstream of the compressor 124. The first air flow sensor 301 detects a flow rate of the air supplied to the compressor 124 (hereinafter, also referred to as a "compressor supply flow rate").

The second air flow sensor 302 is provided in the cathode gas supply passage 121 in the downstream of a connecting portion with the bypass passage 127. The second air flow sensor 302 detects a flow rate of the air supplied to the fuel cell stack 110 out of the air output from the compressor 124 (hereinafter, also referred to as a "stack supply flow rate"). Note that the stack supply flow rate is a flow rate obtained by subtracting the bypass flow rate from the compressor supply flow rate.

The cathode pressure sensor 303 is provided in the cathode gas supply passage 121 in the vicinity of the cathode gas inlet port side of the WRD 125. The cathode pressure sensor 303 detects a pressure of the air in the vicinity of the cathode gas inlet port side of the WRD 125. In other words, the cathode pressure sensor 303 detects a pressure of the air supplied to the fuel cell stack 110 (hereinafter, also referred to as an "air pressure").

The anode gas supply/discharge device 130 supplies the anode gas to the fuel cell stack 110 and discharges the anode off-gas discharged from the fuel cell stack 110 to the cathode gas discharge passage 122. The anode gas supply/discharge device 130 includes a high-pressure tank 131, an anode gas supply passage 132, an anode pressure control valve 133, an anode pressure sensor 304, an anode gas discharge passage 134, a buffer tank 135, a purge passage 136, and a purge valve 137.

The high-pressure tank 131 stores the anode gas (hydrogen) supplied to the fuel cell stack 110 while maintaining it in a high pressure state.

The anode gas supply passage 132 is a passage for supplying the anode gas discharged from the high-pressure tank 131 to the fuel cell stack 110. The anode gas supply passage 132 has one end connected to the high-pressure tank 131 and the other end connected to the anode gas inlet port of the fuel cell stack 110.

The anode pressure control valve 133 is provided in the anode gas supply passage 132. The open/close operation of the anode pressure control valve 133 is controlled by the controller 300 to adjust the pressure of the anode gas supplied to the fuel cell stack 110 to a desired pressure.

The anode pressure sensor 304 is provided in the anode gas supply passage 132 in the downstream of the anode pressure control valve 133 to detect a pressure of the anode gas supplied to the fuel cell stack 110 (hereinafter, also referred to as an "anode pressure"). According to this embodiment, this anode pressure is used a pressure of an anode system expanding from the fuel cell stack 110 to the buffer tank 135.

The anode gas discharge passage 134 has one end connected to the anode gas outlet port of the fuel cell stack 110 and the other end connected to the buffer tank 135. A gas mixture (hereinafter, also referred to as an "anode off-gas") containing the remaining anode gas not used in the electrode reaction and an inert gas containing nitrogen or moisture (generated water or steam) passing from the cathode side of the fuel cell to the anode side is discharged to the anode gas discharge passage 134.

The buffer tank 135 temporarily stores the anode off-gas flowing through the anode gas discharge passage 134. The anode off-gas accumulated in the buffer tank 135 is discharged to the cathode gas discharge passage 122 through the purge passage 136 while the purge valve 137 is opened.

The purge passage 136 has one end connected to the anode gas discharge passage 134 and the other end connected to the cathode gas discharge passage 122.

The purge valve 137 is provided in the purge passage 136. The open/close operation of the purge valve 137 is controlled by the controller 300 to control a flow rate of the anode off-gas discharged from the anode gas discharge passage 134 to the cathode gas discharge passage 122 (hereinafter, also referred to as a "purge flow rate").

The anode off-gas discharged to the cathode gas discharge passage 122 through the anode gas discharge passage 134 is mixed with the cathode off-gas in the cathode gas discharge passage 122 and is discharged to the outside of the fuel cell system 100. Since the anode off-gas contains surplus hydrogen not used in the electrode reaction, a hydrogen concentration of the discharge gas is controlled to a predetermined concentration or lower by mixing it with the cathode off-gas and discharging the mixture to the outside of the fuel cell system 100.

The current sensor 140 detects a current output from the fuel cell stack 110 and supplied to vehicle auxiliary machines 180 such as the battery 160, the drive motor 210, and the compressor 124 (hereinafter, also referred to as an "output current").

The voltage sensor 150 detects a voltage between the anode-side output terminal 11 and the cathode-side output terminal 12 (hereinafter, also referred to as an "output voltage"). The voltage sensor 150 detects voltages of each fuel cell 10 of the fuel cell stack 110 (hereinafter, also referred to as a "cell voltage") and detects a total voltage of the fuel cells 10 as the output voltage. Alternatively, voltages of each group of the fuel cells 10 (cell group voltages) may also be detected.

The battery 160 is a rechargeable secondary battery. The battery 160 is charged with the remaining amount of the generated power (=output current×output voltage) of the fuel cell stack 110 and the regenerative power of the drive motor 210. The power charged in the battery 160 is supplied to the vehicle auxiliary machinery 180 and the drive motor 210 as necessary.

The DC/DC converter 170 has a plurality of switching elements and reactor to serve as a bidirectional DC voltage converter for boosting or dropping the output voltage of the fuel cell stack 110. The output current of the fuel cell stack 110, the generated power, and the charge/discharge operation of the battery 160 are controlled by controlling the output voltage of the fuel cell stack 110 using the DC/DC converter 170.

The vehicle auxiliary machinery 180 includes electric devices such as the compressor 124 other than the drive motor 210 used to drive the vehicle 1.

The drive system 200 includes a drive motor 210, an inverter 220, and a transmission 230.

The drive motor 210 is a drive source for driving the vehicle 1. The drive motor 210 is a three-phase synchronous AC motor having a rotor into which a permanent magnet is integrated and a stator around which a stator coil is wound. The drive motor 210 has an electric motor function for driving rotation by receiving power supplied from the fuel cell stack 110 and the battery 160 and an electric generator function for generating an electromotive force in both ends of the stator coil at the time of speed reduction of the vehicle 1 where the rotor is rotated by an external force.

The inverter 220 includes a plurality of switching elements such as an insulated gate bipolar transistor (IGBT). The open/close operation of the switching element of the inverter 220 is controlled by the controller 300 so as to convert DC power to AC power or AC power to DC power. When the drive motor 210 functions as an electric motor, the inverter 220 converts synthesis DC power of the generated power of the fuel cell stack 110 and the output power of the battery 160 into three-phase AC power and supplies it to the drive motor 210. Meanwhile, when the drive motor 210 functions as an electric generator, the inverter 220 converts the regenerative power (three-phase AC power) of the drive motor 210 into DC power and supplies it to the battery 160.

The transmission 230 is a forward two-stage automatic transmission and is connected to an output shaft of the drive motor 210. The output shaft of the transmission 230 is connected to a drive shaft of the drive wheel 250 through a differential gear 240. The transmission 230 changes a rotation speed of the output shaft of the drive motor 210 (hereinafter, also referred to as a "motor rotation speed") and transmits it to the drive shaft.

The wet/dry state detector 270 obtains an internal impedance value of a high frequency band (for example, several tens kilohertz or higher) (HFR value) of the fuel cell stack 110 on the basis of the output current detection value of the current sensor 140 and the output voltage detection value of the voltage sensor 150. In addition, the wet/dry state detector 270 detects a wet/dry state of the electrolyte membrane of the fuel cell of the fuel cell stack 110 on the basis of a map representing a relationship between the detected HFR value and a degree of wetness of the electrolyte membrane of the fuel cell. In this map, the relationship between the HFR value and the degree of wetness of the electrolyte membrane is set such that the degree of wetness of the electrolyte membrane decreases as the HFR value increases.

The controller 300 is a microcomputer provided with a central processing unit (CPU), a read-only memory (ROM), a random access memory (RAM), and input/output interface (I/O interface). According to this embodiment, the controller 300 serves as a device for setting the amount or flow rate of the supplied air.

The controller 300 receives signals input from various sensors such as the current sensor 140, the voltage sensor 150, the second air flow sensor 302, an accelerator stroke sensor 310 that detects a depression level of the accelerator pedal corresponding to a load of the fuel cell stack 110 (hereinafter, also referred to as an "accelerator depression level"), a first rotation speed sensor that detects a motor rotation speed (=input rotation speed of the transmission), and a second rotation speed sensor 312 that detects an output rotation speed of the transmission 230.

The controller 300 calculates a target value of the generated power on the basis of power required in the drive motor 210, power required in the vehicle auxiliary machinery 180, and a charge/discharge requirement of the battery 160.

The controller 300 performs a feedback control for the compressor 124 and the bypass valve 128 so as to satisfy both a stack requirement and a dilution requirement. Here, the stack requirement refers to a requirement for generating electricity in the fuel cell stack 110 in an optimum state considering securing of an oxygen partial pressure, the HFR of the electrolyte membrane, or the like when the generated power is set to the target value. The dilution requirement refers to a requirement for setting a hydrogen concentration of the discharge gas discharged to the outside of the fuel cell system 100 to a predetermined concentration or lower.

The controller 300 uses the detection value of the first air flow sensor 301 (detection value of the compressor supply flow rate) in the control of the compressor 124 and uses the detection value of the second air flow sensor 302 (detection value of the stack supply flow rate) in the control of the bypass valve 128.

The controller 300 changes the gear speed level of the transmission 230 on the basis of a drive condition of the vehicle 1.

Figure 2:
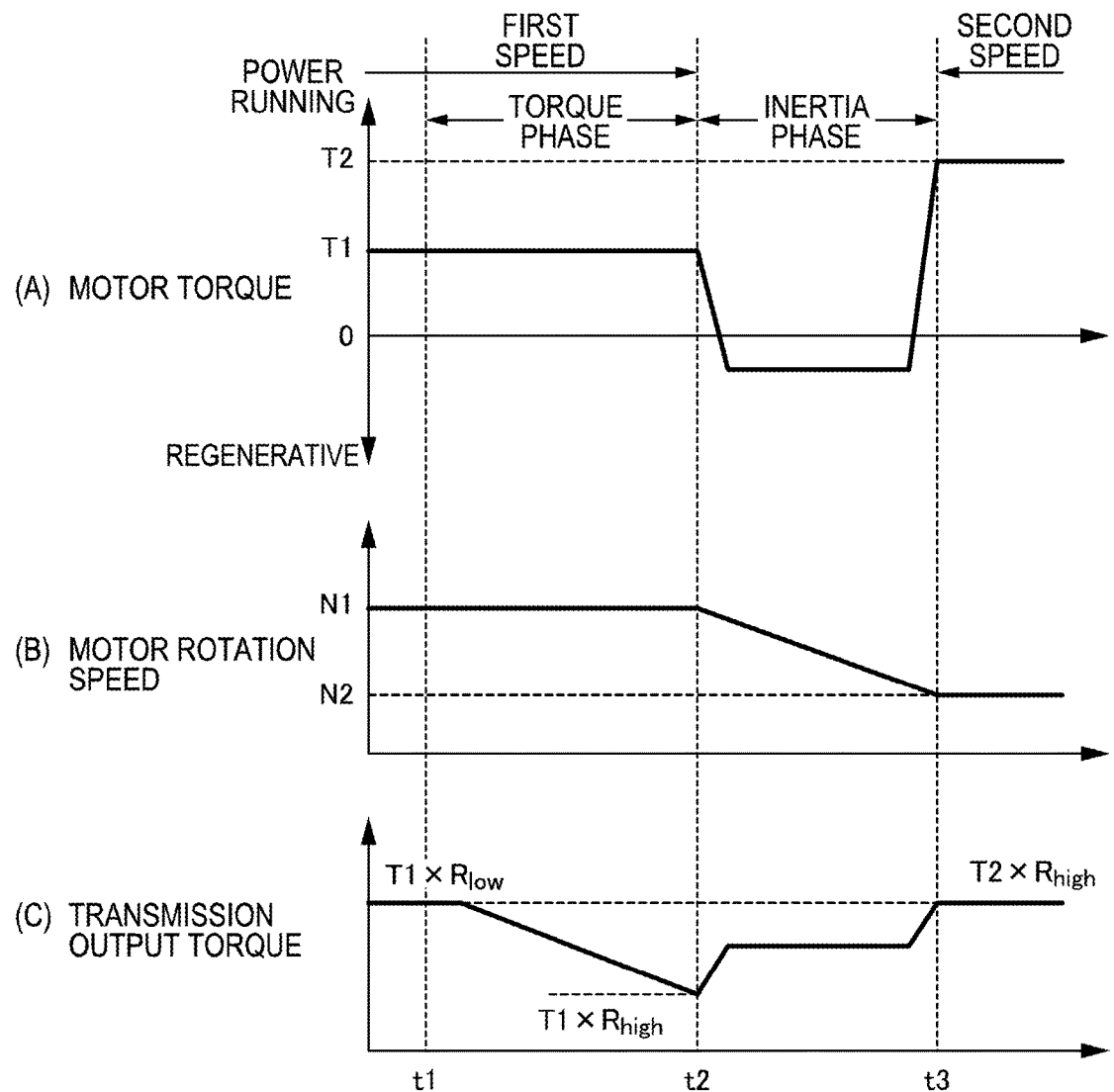
FIG. 2 is a timing chart illustrating an upshift speed change operation for changing a gear speed level of a transmission from a first gear to a second gear.

FIG. 2 is a timing chart illustrating an upshift speed change operation for changing a gear speed level of the transmission 230 from a first gear to a second gear.

As illustrated in FIG. 2, the upshift speed change operation is completed through a torque phase and an inertia phase. The torque phase is one of gearshift phases generated in the course of the upshift operation, in which a torque of the output shaft of the transmission 230 (hereinafter, also referred to as a "transmission output torque") changes without changing the motor rotation speed. The inertia phase is one of the gearshift phases generated in the course of the upshift operation, in which the motor rotation speed changes as the inertia of the drive system changes. Specifically, during the upshift operation, the motor rotation speed decreases from the rotation speed N1 prior to the gearshift operation to a rotation speed N2 (where N2=N1×$R_{high}$/$R_{low}$) obtained by multiplying the gearshift ratio $R_{low}$ of the first gear by the gearshift ratio $R_{high}$ of the second gear.

At the timing t1, the upshift speed change operation starts, and the torque phase is established. Then, clutch engagement in the second gear side starts while opening the clutch of the first gear side of the transmission 230. As a result, the motor rotation speed does not change from the motor rotation speed N1 prior to the gearshift operation, and the transmission output torque gradually decreases. That is, the transmission output torque decreases from a torque value (T1×$R_{low}$) obtained by multiplying the motor torque T1 prior to the gearshift operation by the gearshift ratio $R_{low}$ of the first gear to a torque value (T1×$R_{high}$) obtained by multiplying the motor torque T1 prior to the gearshift operation by the gearshift ratio $R_{high}$ of the second gear.

At the timing t2, the operation advances to the inertia phase when the transmission output torque decreases to a torque value (T1×$R_{high}$) obtained by multiplying the motor torque T1 by the gearshift ratio $R_{high}$ of the second gear. In the inertia phase, while a so-called slip control is performed in the transmission 230, the motor rotation speed decreases from N1 to N2. In this case, in order to suppress the transmission output torque from increasing due to an inertia torque caused by a change of the drive system rotation speed, the motor torque temporarily decreases. In addition, when the inertia phase is terminated, it is necessary to increase the motor torque from the motor torque T1 prior to the gearshift operation to the target motor torque T2 subsequent to the gearshift operation in order to prevent a shock caused by a torque difference before and after the gearshift operation. That is, it is necessary to increase the motor torque to the target motor torque T2 in order to match the transmission output torque (T2×$R_{high}$) subsequent to the gearshift operation with the transmission output torque (T1×$R_{low}$) prior to the gearshift operation.

Figure 3:
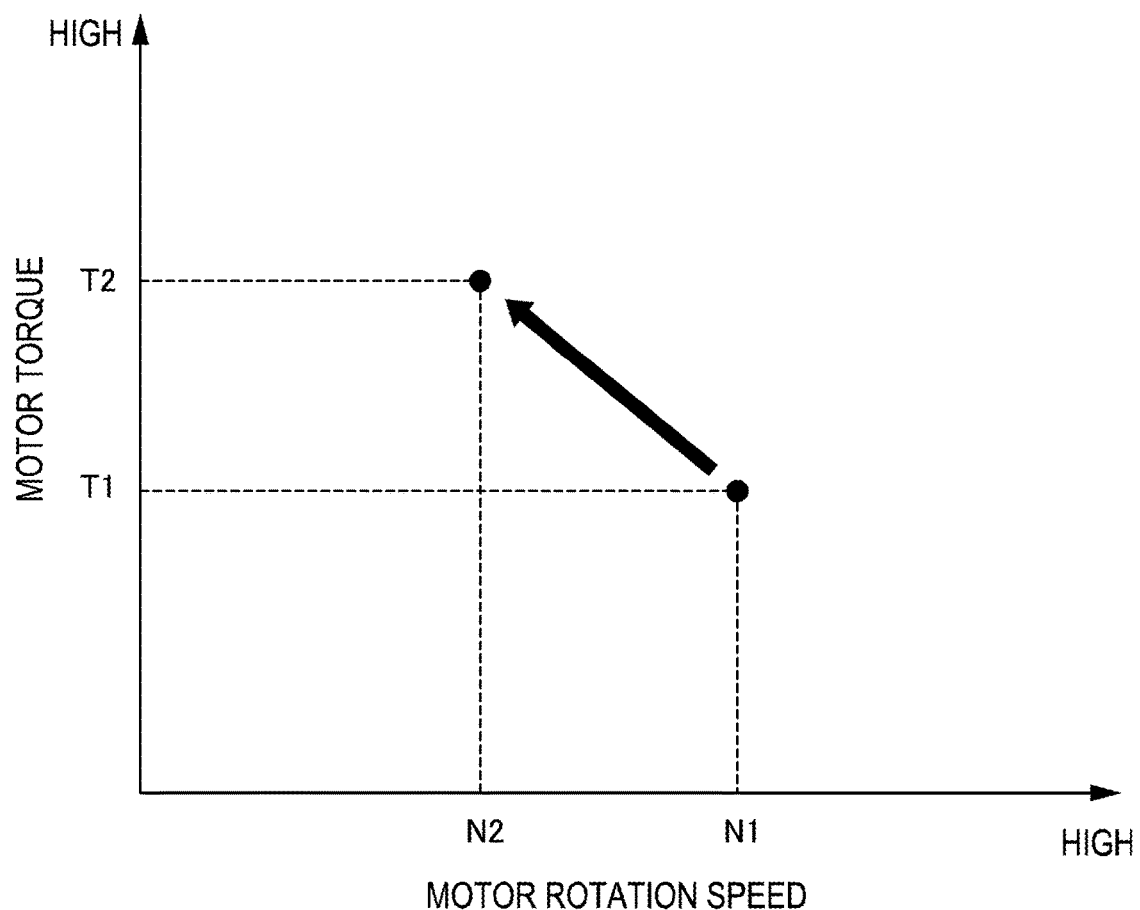
FIG. 3 illustrates a relationship between a motor rotation speed and a motor torque.

FIG. 3 illustrates a relationship between the motor rotation speed and the motor torque. The motor torque T2 obtained by setting the motor rotation speed to N2 becomes higher than the motor torque T1 obtained by setting the motor rotation speed to N1. Therefore, it is necessary to decrease the motor rotation speed in order to increase the motor torque to the target motor torque T2. Here, in order to reduce the gearshift time, it is effective to reduce the period of the inertia phase by rapidly reducing the motor rotation speed from the motor rotation speed N1 prior to the gearshift operation to the motor rotation speed N2 corresponding to the target motor torque T2.

For this reason, according to this embodiment, when the operation advances to the inertia phase at the timing t2, the drive motor 210 temporarily switches from the power running operation to the regenerative operation as illustrated in FIG. 2. As a result, the motor rotation speed rapidly decreases from the motor rotation speed N1 prior to the gearshift operation to the motor rotation speed N2 corresponding to the target motor torque T2.

At the timing t3, the drive motor 210 returns to the power running operation when the motor rotation speed decreases to N2. Then, the motor torque T2 is output, and the inertia phase is terminated.

In this manner, according to this embodiment, in order to reduce the gearshift time during the inertia phase of the upshift operation, the drive motor 210 temporarily switches from the power running operation to the regenerative operation.

Typically, the generated power of the fuel cell stack 110 is consumed by loads of the fuel cell stack 110 such as the drive motor 210 or the vehicle auxiliary machinery 180 and is output to the battery 160 which is also the load. However, as the operation advances to the inertia phase, the drive motor 210 temporarily switches to the regenerative operation in order to decrease the motor rotation speed. Therefore, the power consumption of the drive motor 210 is not reduced, and electricity is generated, so that the required generated power decreases. For this reason, in the inertia phase, the control is performed such that the supplied power does not become excessive by reducing the generated power (output power).

That is, in the prior art, as the operation advances to the inertia phase of the upshift operation, the generated power is reduced from the generated power immediately prior to transition to the inertia phase to the target value of the generated power set during the inertia phase. In addition, depending on this decrease of the generated power, the output voltage is controlled by the DC/DC converter 170 to reduce the output current output from the fuel cell stack 110 by the battery 160 or the vehicle auxiliary machinery 180. In addition, in the prior art, in order to reduce the stack supply flow rate depending on this output current reduction, the output of the compressor 124 is restricted, or the opening level of the bypass valve 128 increases.

However, in the pneumatic system such as the compressor 124 or the bypass valve 128, a response delay is long, and a time lag is generated until the stack supply flow rate decreases in practice in response to a command issued to the pneumatic system. For this reason, the output current reduction is performed for a predetermined period of time depending on the response delay of the pneumatic system. In addition, when the generated power is restored (increases) in the inertia phase termination stage, the output current increases inversely. Therefore, it is necessary to control the pneumatic system such that the output of the compressor 124 increases depending on the increase of the output current. However, even in this case, due to a problem of the response delay, it is necessary to increase the output current for a predetermined period of time. Therefore, the gearshift time increases at the transition to or end of the inertia phase, which is disadvantageous.

In this regard, the inventors found a fuel cell vehicle control method capable of preventing a delay of the gearshift time. This fuel cell vehicle control method will now be described.

Figure 4:
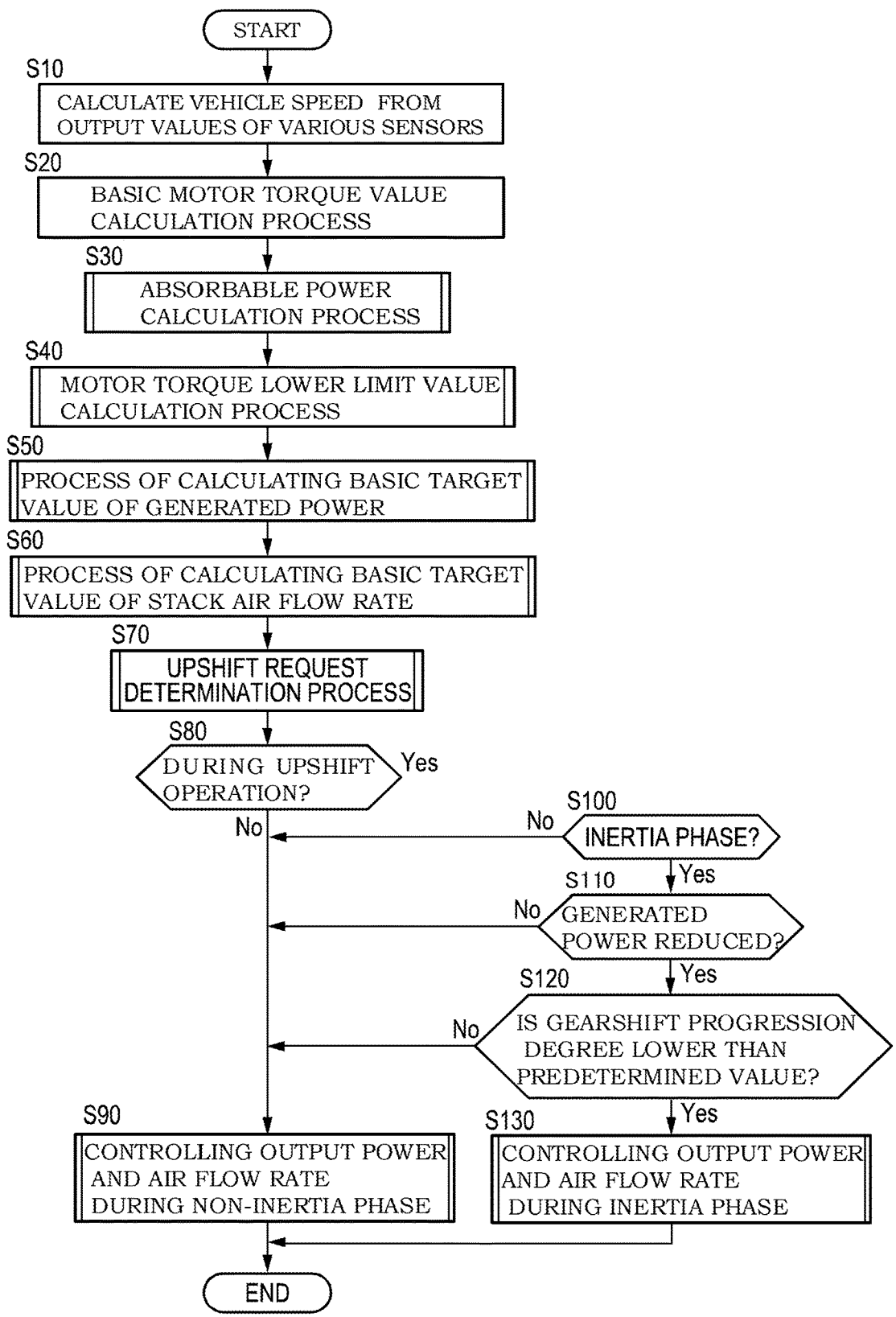
FIG. 4 is a flowchart illustrating a fuel cell vehicle control according to an embodiment of the invention.

FIG. 4 is a flowchart illustrating a fuel cell vehicle control according to this embodiment. The controller 300 repeatedly executes this routine at a predetermined computation cycle.

In step S10, the controller 300 computes a vehicle speed on the basis of the motor rotation speed, an actual gearshift ratio of the transmission 230 obtained by dividing the motor rotation speed by the rotation speed of the output shaft of the transmission 230 (hereinafter, also referred to as an "output rotation speed"), and a wheel diameter and a gear reduction ratio of the differential gear 240 stored in advance in the ROM. Alternatively, the vehicle speed may be calculated on the basis of the output rotation speed of the transmission 230, the wheel diameter, and the gear reduction ratio.

In step S20, the controller 300 performs a basic motor torque calculation process. The basic motor torque calculation process is a process of calculating a target value of the motor torque required by a driver (hereinafter, also referred to as a "basic motor torque value") on the basis of an accelerator depression level (the load of the drive motor 210) corresponding to the driver's request. In other words, the basic motor torque value is a target value of the motor torque necessary to set the driving force of the vehicle 1 to the driving force required by a driver (hereinafter, also referred to as a "required drive force").

Figure 5:
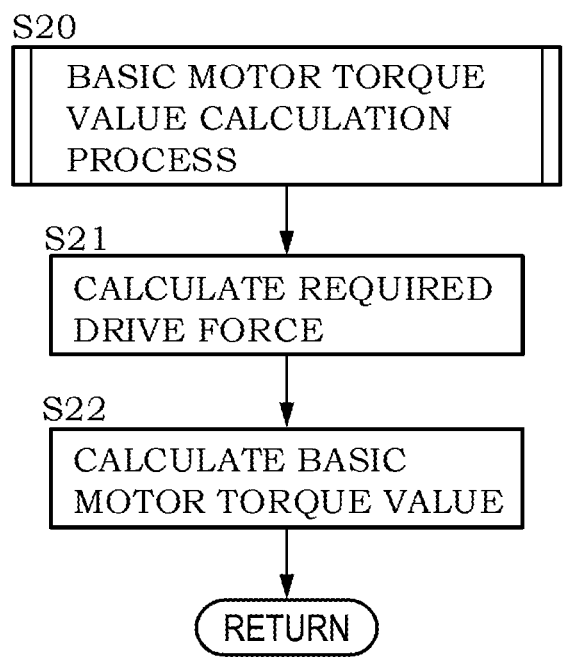
FIG. 5 is a flowchart illustrating a process of calculating a basic motor torque value in details.
Figure 6:
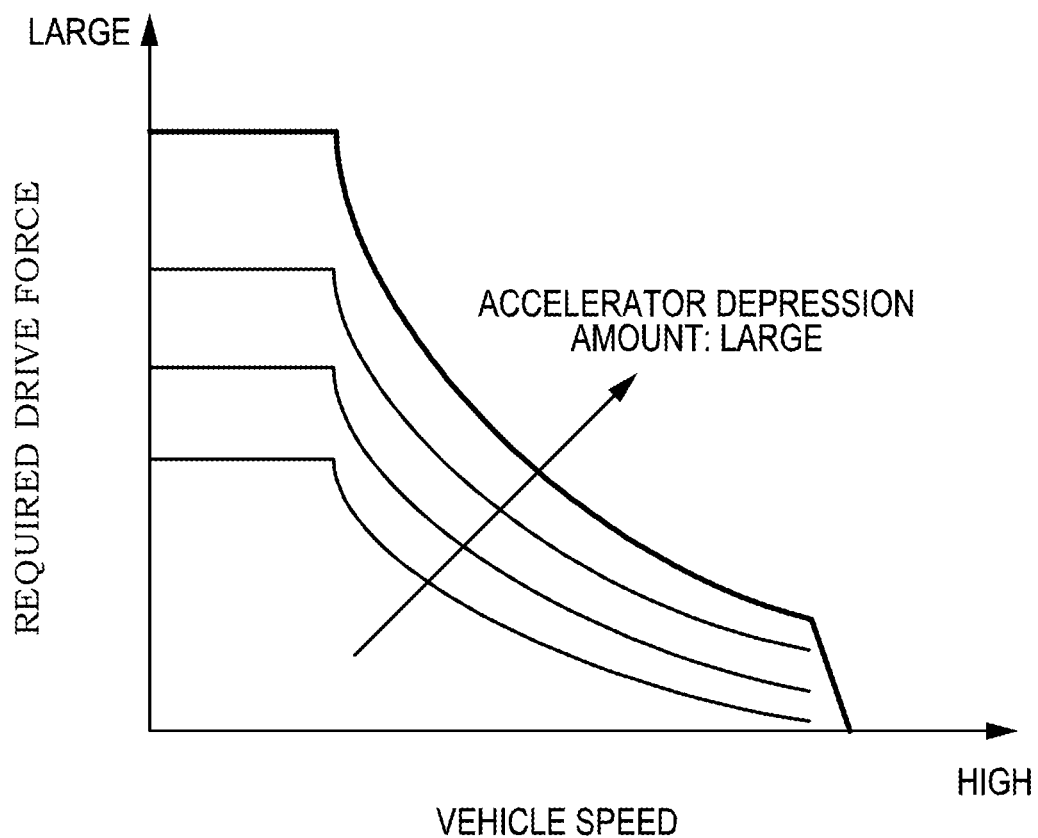
FIG. 6 is a map for calculating a required drive force.

FIG. 5 is a flowchart illustrating a process of calculating a basic motor torque value in details In step S21, the controller 300 calculates the required drive force on the basis of the accelerator depression level and the vehicle speed with reference to the map of the required drive force of FIG. 6.

In step S22, the controller 300 calculates the basic motor torque value by dividing the required drive force calculated in step S21 by the actual gearshift ratio of the transmission 230.

Returning to FIG. 4, in step S30, the controller 300 performs an absorbable power calculation process.

Figure 7:
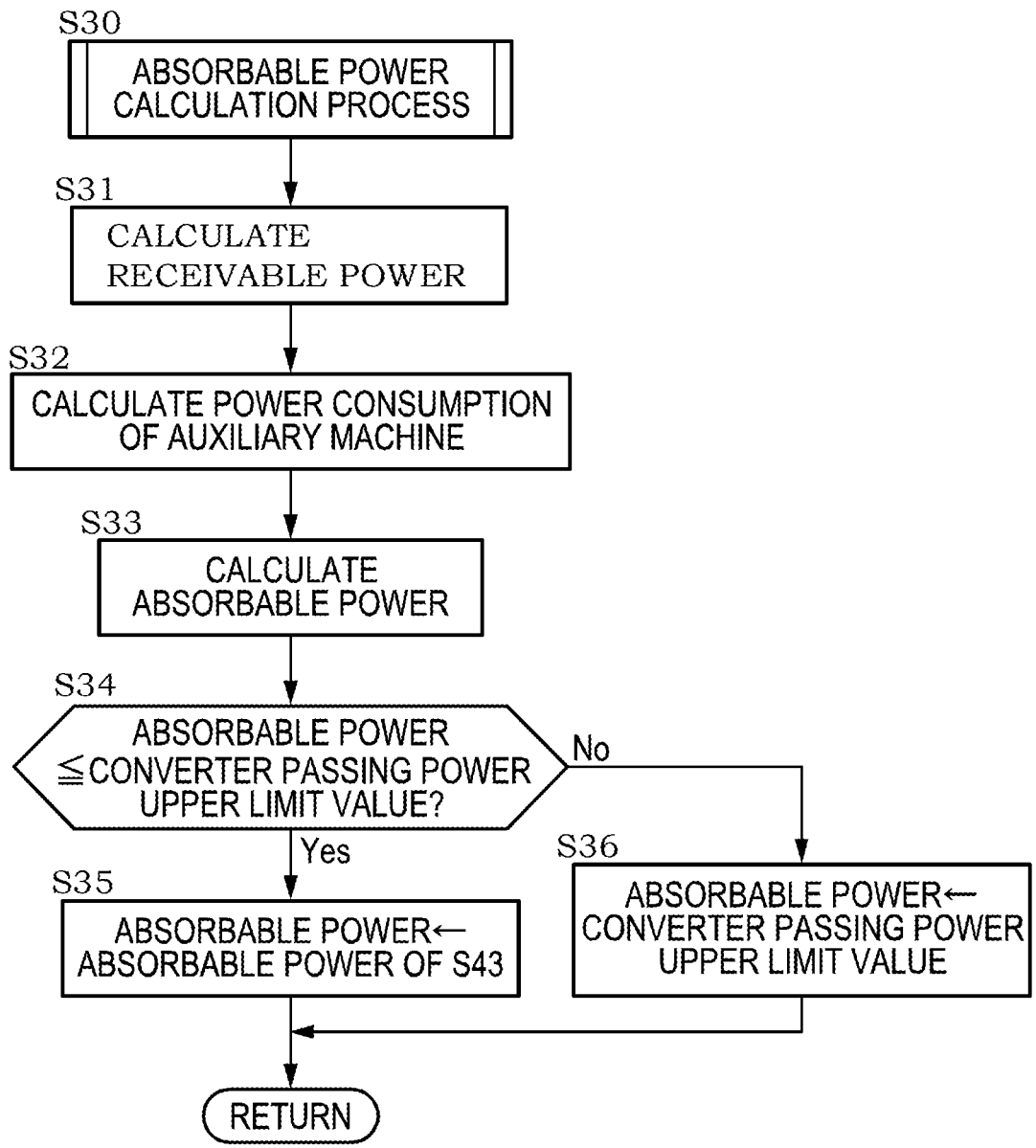
FIG. 7 is a flowchart illustrating an absorbable power calculation process in details.

FIG. 7 is a flowchart illustrating an absorbable power calculation process in details.

In step S31, the controller 300 reads receivable power of the battery 160 set in advance. The receivable power is an upper limit value of the power that can be received by the battery 160 per unit time, that is, chargeable power. Alternatively, the receivable power may have a margin set to the upper limit.

In step S32, the controller 300 calculates a power consumption of the currently running vehicle auxiliary machinery 180 (hereinafter, also referred to as "auxiliary machinery consumption power"). In other words, the auxiliary machinery consumption power is power that can be absorbed by the vehicle auxiliary machinery 180 such as the compressor 124.

In step S33, the controller 300 calculates, as the absorbable power, a sum of the receivable power of the battery 160 obtained in step S31 and the power consumption of the vehicle auxiliary machinery 180 calculated in step S32. In other words, the absorbable power is maximum value of power that can be absorbed by the battery 160 and the vehicle auxiliary machinery 180.

According to this embodiment, the battery 160 and the vehicle auxiliary machinery 180 are collectively referred to as a "power absorption element 400". Alternatively, only the battery 160 may be referred to as the power absorption element 400.

In step S34, the controller 300 determines whether or not the absorbable power calculated in step S33 is equal to or lower than an upper limit value of converter-passing power set in advance.

Here, the upper limit value of the converter-passing power is a predetermined upper limit value set to prevent deterioration of the DC/DC converter 170. That is, if the power passing through the DC/DC converter 170 (hereinafter, also referred to as a "converter-passing power") increases while the generated power is absorbed by the power absorption element 400, a current passing through a reactor as a component of the DC/DC converter 170 also increases, so that a current equal to or larger than a rated value may flow. If the current equal to or larger than the rated value flows to the reactor in this manner, the reactor and further the DC/DC converter 170 may be deteriorated. For this reason, the aforementioned upper limit value is provided in the converter-passing power.

Therefore, when the absorbable power is equal to or lower than upper limit value of the converter-passing power, it is necessary to restrict the power absorbed by the power absorption element 400 to the upper limit value of the converter-passing power although the absorbable power can be entirely absorbed by the power absorption element 400.

In this regard, when the absorbable power is equal to or lower than upper limit value of the converter-passing power, the controller 300 advances to step S35, and directly sets the absorbable power calculated in the step S33 as final absorbable power. Meanwhile, when the absorbable power is higher than the upper limit value of the converter-passing power, the controller 300 advances to step S36, and sets the upper limit value of the converter-passing power as the final absorbable power.

Returning to FIG. 4, in step S40, the controller 300 performs a motor torque lower limit value calculation process. The process of calculating the lower limit value of the motor torque is a process for calculating the lower limit value of the motor torque (hereinafter, also referred to as a "motor torque lower limit value") in the inertia phase of the upshift operation.

Figure 8:
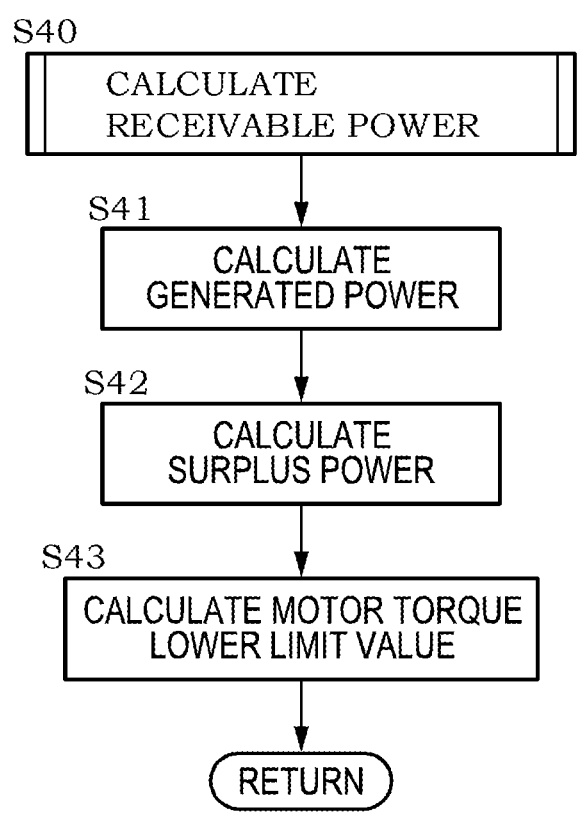
FIG. 8 is a flowchart illustrating a motor torque lower limit value calculation process in details.

FIG. 8 is a flowchart illustrating the motor torque lower limit value calculation process.

In step S41, the controller 300 calculates the generated power of the fuel cell stack 110 on the basis of the output current detected by the current sensor 140 and the output voltage detected by the voltage sensor 150.

In step S42, the controller 300 calculates power obtained by subtracting the absorbable power from the generated power as "surplus power". When this surplus power is calculated as a positive value, this means that excessive power is generated such that it is difficult to absorb it using the power absorption element 400 of the fuel cell stack 110. Therefore, it is necessary to consume the calculated surplus power using the drive motor 210. Meanwhile, when this surplus power is calculated as a negative value, regeneration using the drive motor 210 can be performed as much as this negative value.

Figure 9:
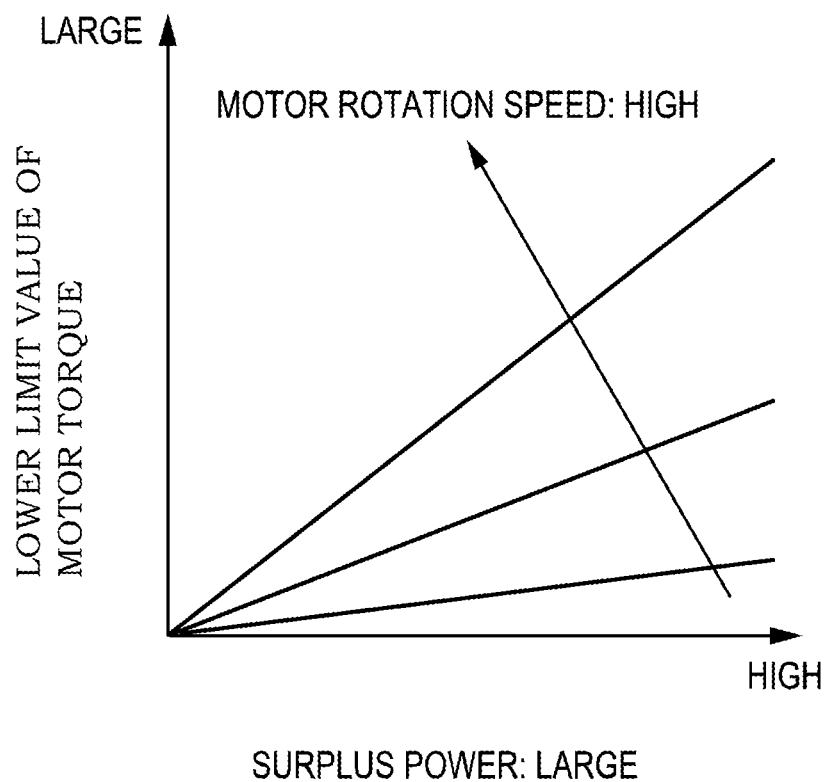
FIG. 9 is a map for calculating a motor torque lower limit value.

In step S43, the controller 300 calculates the motor torque lower limit value on the basis of the surplus power and the motor rotation speed with reference to the map of the motor torque lower limit value of FIG. 9. Alternatively, the motor rotation speed is not necessary to calculate the motor torque lower limit value, and the motor torque lower limit value may be calculated on the basis of only the surplus power. In other words, the motor torque lower limit value is a lower limit value of the motor torque set not to charge the battery 160 over the receivable power during the inertia phase of the upshift operation.

Returning to FIG. 4, in step S50, the controller 300 performs a process of calculating a basic target value of the generated power.

Figure 10:
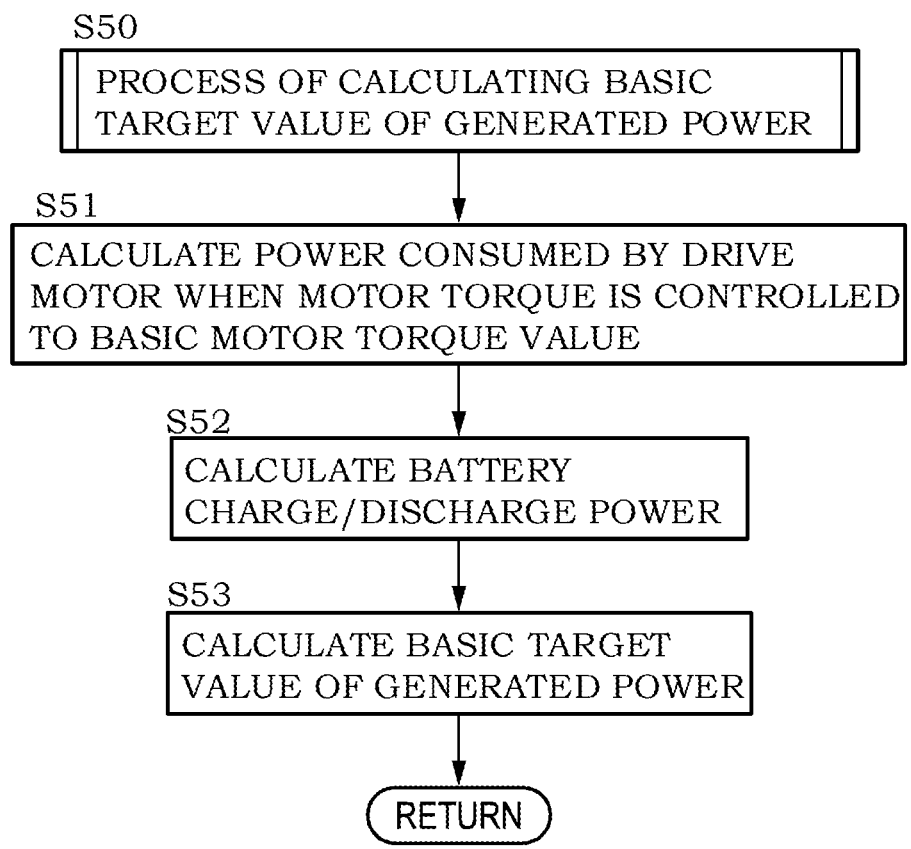
FIG. 10 is a flowchart illustrating a process of calculating a basic target value of generated power.

FIG. 10 is a flowchart illustrating a process of calculating a basic target value of the generated power.

In step S51, the controller 300 calculates power consumed by the drive motor 210 when the motor torque is controlled to the basic motor torque value. This power may be calculated on the basis of the basic motor torque value with reference to a table or the like set in advance by associating the basic motor torque value with the power consumption of the drive motor 210.

In step S52, the controller 300 calculates battery charge/discharge power on the basis of a battery charge amount detected by a state-of-charge (SOC) sensor (not shown). Note that, when the battery charge amount is larger than a predetermined threshold value, a negative power value is calculated as the battery charge/discharge power in order to discharge power from the battery 160.

In step S53, the controller 300 calculates a total sum of the power calculated in step S51, the battery charge/discharge power calculated in step S52, and the auxiliary machinery consumption power as a basic target value of the generated power. That is, the controller 300 calculates the basic target value of the generated power on the basis of a state of the load connected to the fuel cell stack 110.

Returning to FIG. 4, in step S60, the controller 300 calculates a basic target value of the stack supply flow rate on the basis of the basic target value of the generated power calculated in step S50.

Figure 11:
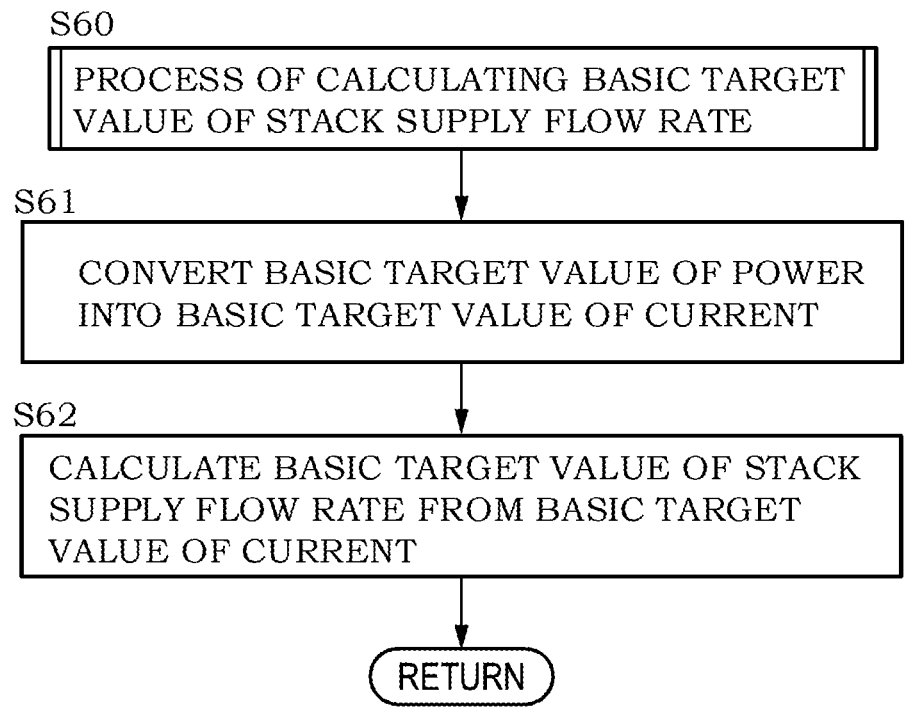
FIG. 11 is a flowchart illustrating a process of calculating a basic target value of the stack supply flow rate.

FIG. 11 is a flowchart illustrating a process of calculating a basic target value of the stack supply flow rate.

In step S61, the controller 300 converts the basic target value of the generated power calculated in step S50 into a basic target value of the output current.

In step S62, the controller 300 calculates a basic target value of the stack supply flow rate from the basic target value of the output current obtained in step S61. Specifically, the basic target value of the stack supply flow rate is calculated from the basic target value of the output current, for example, using a predetermined map showing a relationship between the output current and the stack supply flow rate.

Returning to FIG. 4, in step S70, the controller 300 performs an upshift request determination process. The upshift request determination process is a process for determining whether or not there is an upshift request of the transmission 230.

Figure 12:
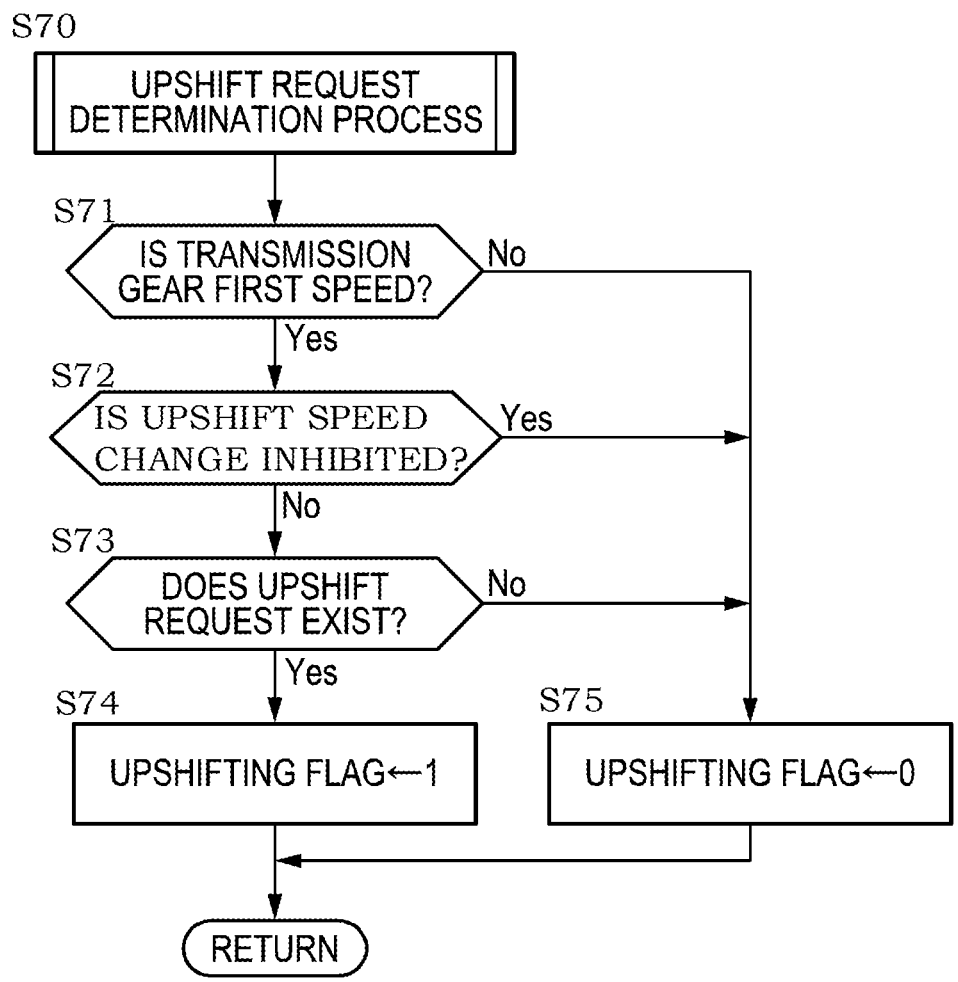
FIG. 12 is a flowchart illustrating an upshift request determination process.

FIG. 12 is a flowchart illustrating the upshift request determination process in details.

In step S71, the controller 300 determines whether or not the gear speed level of the transmission 230 is positioned in the first gear. If the gear speed level is positioned in the first gear, the controller 300 processes step S72. In the case of the second gear, the controller 300 processes step S75.

In step S72, the controller 300 determines whether or not an upshift speed change operation of the transmission 230 is inhibited. Specifically, if the absorbable power is lower than a predetermined value, the controller 300 inhibits the upshift speed change operation. Otherwise, if the absorbable power is equal to or larger than the predetermined value, the upshift speed change operation is permitted.

When the upshift speed change operation is inhibited, the controller 300 processes step S75. When the upshift speed change operation is permitted, the controller 300 processes step S73.

Figure 13:
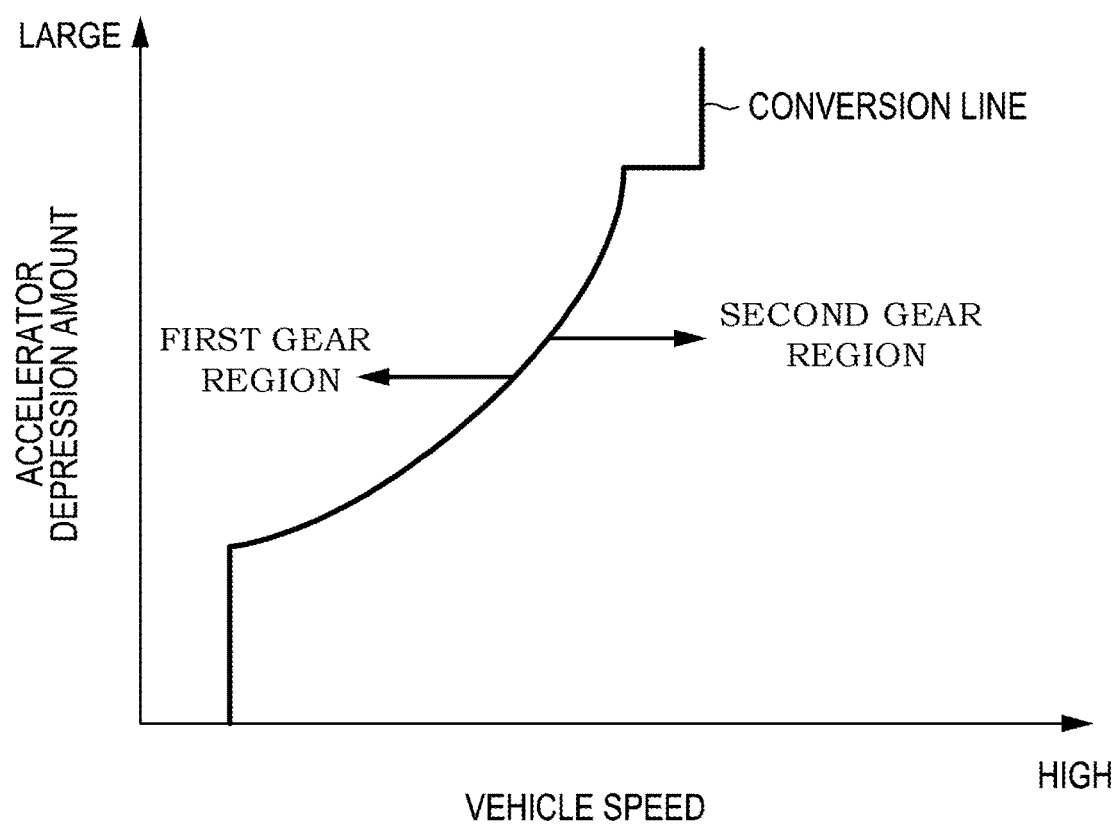
FIG. 13 is a gearshift map.

In step S73, the controller 300 determines whether or not there is an upshift request from a driver on the basis of the accelerator depression level and the vehicle speed representing a condition of the driver of the vehicle 1 with reference to the gearshift map of FIG. 13. When an operation point set by the accelerator depression level and the vehicle speed is positioned in a second gear region on the gearshift map of FIG. 13, the controller 300 determines that there is an upshift request. If there is an upshift request from a driver, the controller 300 processes step S74. If there is no upshift request, the controller 300 processes step S75.

In step S74, the controller 300 sets an upshift speed change flag to "1". The upshift speed change flag is set to "1" while the upshift speed change operation is being executed. That is, when the upshift speed change flag is set to "1", the current gear speed level is set to the first gear, the upshift speed change operation is not inhibited, and there is the upshift request. Therefore, it is possible to determine that the upshift speed change operation is being executed.

In step S75, the controller 300 sets the upshift speed change flag to "0". In this case, it can be determined that the upshift speed change operation is not being executed.

Returning to FIG. 4, in step S80, the controller 300 determines whether or not the upshift speed change operation is being executed. Specifically, it is determined whether or not the upshift speed change flag set in the upshift request determination process of step S70 is set to "1". If it is determined that the upshift speed change operation is not being executed (upshift speed change flag=0), the controller 300 processes step S90. Otherwise, if it is determined that the upshift speed change operation is being executed (upshift speed change flag=1), the controller 300 processes step S100.

In step S90, the controller 300 performs a power control and a flow rate control during the non-inertia phase.

Figure 14:
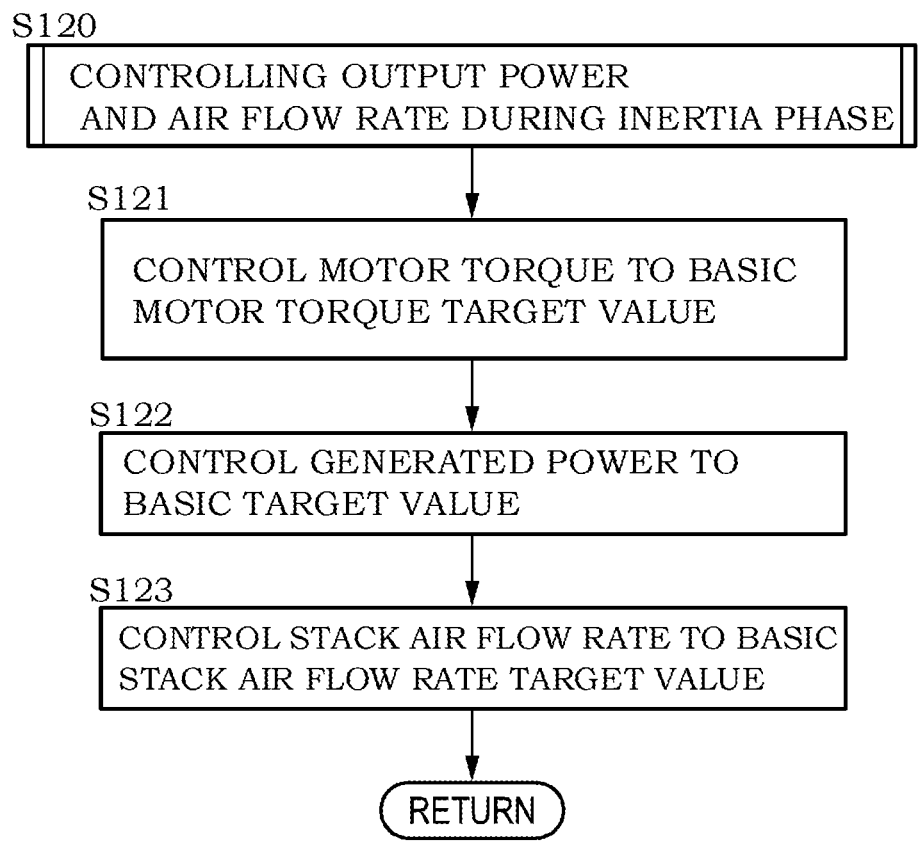
FIG. 14 is a flowchart illustrating a control for output power and a stack supply flow rate during a non-inertia phase.

FIG. 14 is a flowchart illustrating an output power control and a stack supply flow rate control during the non-inertia phase in details.

In step S121, the controller 300 controls the inverter 220 such that the motor torque becomes the basic motor torque value calculated in step S20 of FIG. 4 in order to control power supplied to the drive motor 210. That is, the controller 300 controls the current output by the drive motor 210.

In step S122, the controller 300 controls the generated power to the basic target value. Specifically, the output current is controlled such that the output current becomes the basic target value of the output current calculated in step S61.

In step S123, the controller 300 performs the control such that the stack supply flow rate becomes the basic target value of the stack supply flow rate calculated in step S62 of FIG. 11.

Specifically, the controller 300 calculates a basic target value of the air pressure on the basis of the basic target value of the output current calculated in step S61, and calculates a basic target value of the compressor supply flow rate on the basis of the basic target value of the same output current. In addition, the controller 300 controls the opening level of the cathode pressure control valve 126, the opening level of the bypass valve 128, and the torque of the compressor 124 such that the air pressure detection value of the cathode pressure sensor 303, the compressor supply flow rate detection value of the first air flow sensor 301, and the stack supply flow rate detection value of the second air flow sensor 302 become the basic target value of the air pressure, the basic target value of the compressor supply flow rate, and the basic target value of the stack supply flow rate, respectively.

Returning to FIG. 4, if it is determined that the upshift speed change operation is being executed in step S80 described above, in step S100, the controller 300 determines whether or not the upshift speed change operation is under the inertia phase.

Specifically, if the actual gearshift ratio obtained by dividing the motor rotation speed by the output rotation speed of the transmission 230 is smaller than the gearshift ratio prior to the upshift operation (=gearshift ratio of the first gear), the controller 300 determines that the upshift operation is under the inertia phase. If the actual gearshift ratio is equal to or larger than the gearshift ratio prior to the upshift operation, the controller 300 determines that the upshift operation is not under the inertia phase. In addition, if it is determined that the upshift operation is under the inertia phase, the controller 300 processes step S110. Otherwise, if it is determined that the upshift operation is not under the inertia phase, the controller 300 processes step S90 described above, and this routine is terminated.

In step S110, the controller 300 determines whether or not the generated power is reduced. Here, according to this embodiment, in the inertia phase of the upshift speed change operation, the drive motor 210 switches from the power running operation to the regenerative operation as described above in conjunction with FIG. 2, so that the generated power of the fuel cell stack 110 may become excessive (required generated power is reduced) in some cases. In this case, it is necessary to reduce the generated power target value. Meanwhile, for example, when there is a room in the charging amount of the battery 160, and the generated power of the fuel cell stack 110 can be sufficiently supplied to the battery 160, the generated energy amount of the fuel cell stack 110 may not be restricted even in the inertia phase.

Therefore, according to this embodiment, a subsequent control pattern is classified as described below on the basis of whether or not it is necessary to reduce the generated power target value of the fuel cell stack 110 in the inertia phase. The determination on whether or not it is necessary to reduce the generated power target value of the fuel cell stack 110 will be described.

Figure 15:
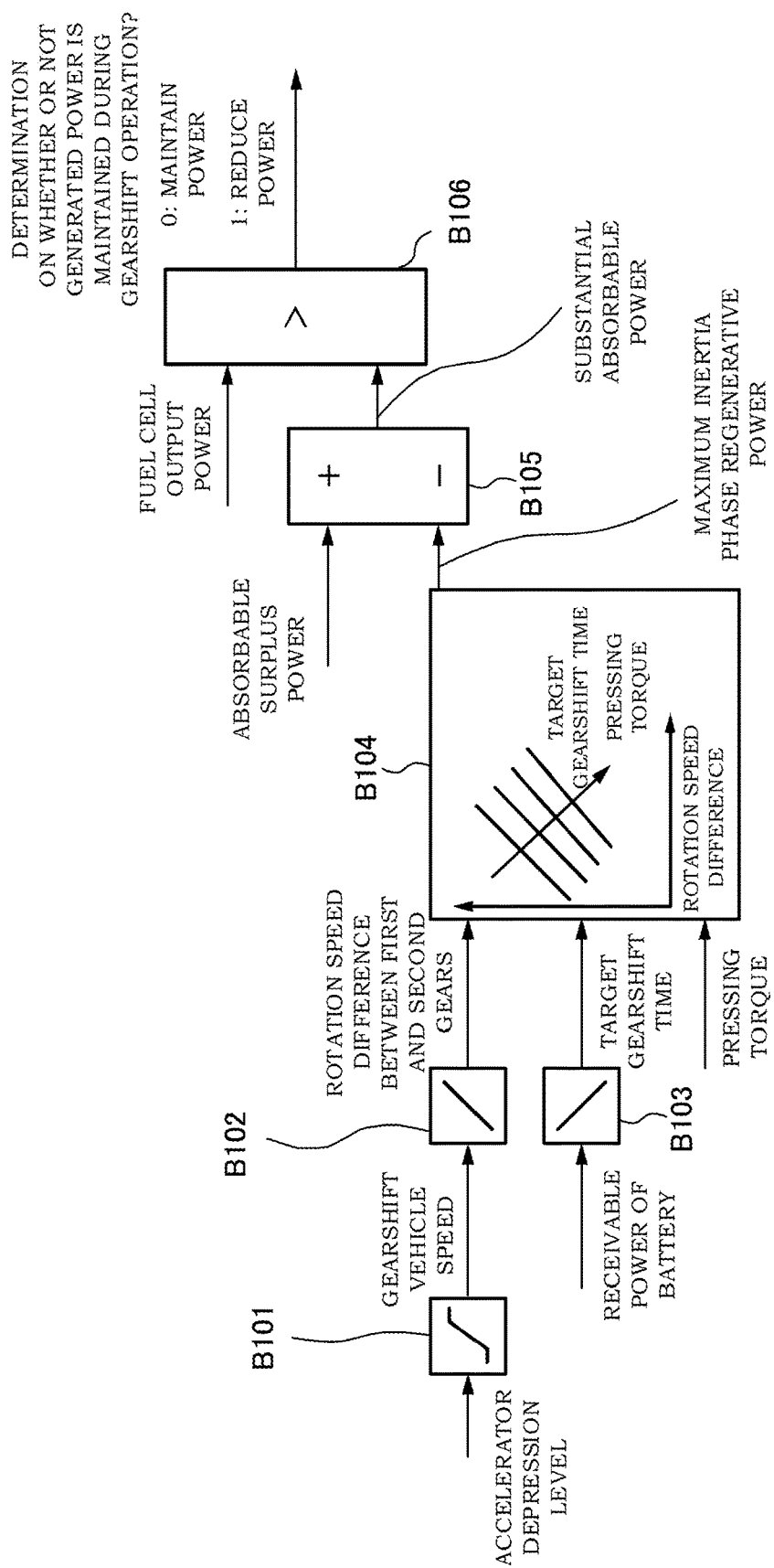
FIG. 15 is a block diagram illustrating a flow of determining whether or not the generated power is reduced during a gearshift operation.

FIG. 15 is a block diagram illustrating a flow for determining whether or not the generated power is reduced during a gearshift operation. Note that functions of the blocks illustrated in each block diagram described below are implemented by the controller 300. As illustrated in FIG. 15, this flow includes a gearshift vehicle speed calculation block B101, a rotation speed difference calculation block B102, a target gearshift time calculation block B103, a maximum inertia phase regenerative power calculation block B104, a substantial absorbable power calculation block B105, and a block B106 for determining generated power reduction during a gearshift operation.

First, the accelerator depression level detected by the accelerator stroke sensor 310 is input to the gearshift vehicle speed calculation block B101. The gearshift vehicle speed calculation block B101 stores the gearshift map of FIG. 13 and obtains a vehicle speed of the gearshift operation (hereinafter, also referred to as a "gearshift vehicle speed") from the detected accelerator depression level on the basis of this gearshift map. Specifically, the gearshift vehicle speed is a vehicle speed at an intersection between the detected accelerator depression level and a conversion line which is a boundary between the first and second gear regions of FIG. 13.

Figure 18:
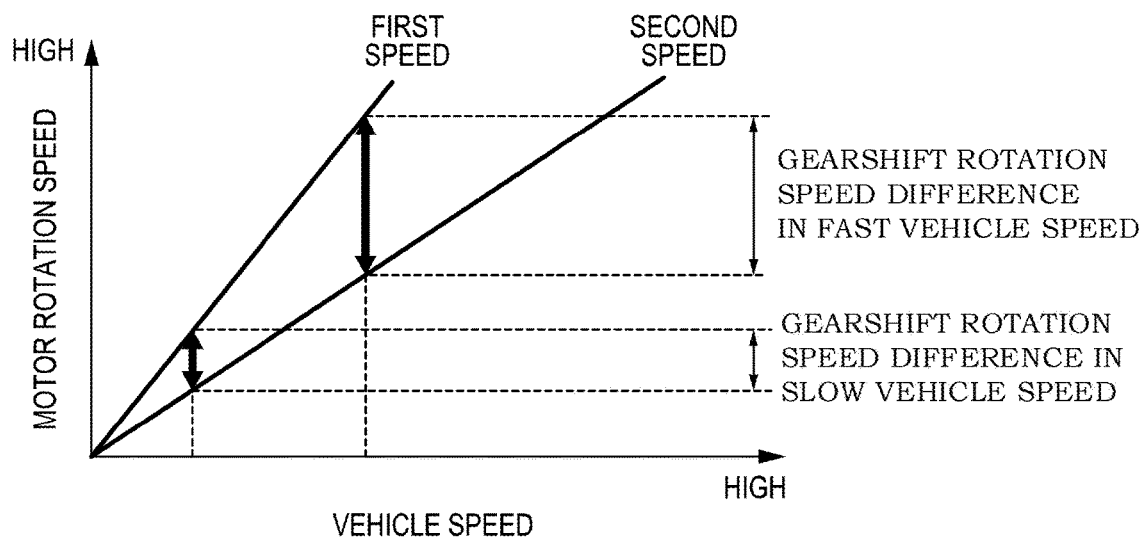
FIG. 18 is a diagram illustrating a relationship between a vehicle speed and a motor rotation speed difference before and after a gearshift operation.

The gearshift vehicle speed calculated in the gearshift vehicle speed calculation block B101 is input to the rotation speed difference calculation block B102. In the rotation speed difference calculation block B102, a difference of the rotation number of the drive motor 210 between the first and second gears (hereinafter, also referred to as a "motor rotation speed difference") is calculated from the calculated gearshift vehicle speed on the basis of a map of the difference between the gearshift vehicle speed and the rotation speed prepared in advance. An example of this map is illustrated in FIG. 18. As recognized from FIG. 18, it is possible to obtain the difference of the motor rotation speed between the first and second gears by setting the gearshift vehicle speed. As the gearshift vehicle speed increases, the rotation speed difference increases.

Meanwhile, the receivable power of the battery 160 is input to the target gearshift time calculation block B103. In the target gearshift time calculation block B103, the target gearshift time is calculated from the receivable power of the battery 160 on the basis of a map representing a relationship between the battery receivable power and the target gearshift time prepared in advance. Note that, as the receivable power of the battery 160 increases, the target gearshift time decreases.

The motor rotation speed difference calculated in the rotation speed difference calculation block B102 and the target gearshift time calculated in the target gearshift time calculation block B103 are input to the maximum inertia phase regenerative power calculation block B104. In the maximum inertia phase regenerative power calculation block B104, maximum regenerative power in the inertia phase (hereinafter, also referred to as a "maximum inertia phase regenerative power") is calculated from the motor rotation speed difference, the target gearshift time, and a pressing torque value set in advance on the basis of a map prepared in advance.

Here, since the energy caused by the motor rotation speed difference described above is absorbed in the regenerative energy and the clutch friction energy, a total regenerable energy is determined by subtracting a thermal energy consumption caused by the clutch friction from energy of the motor rotation speed difference. Therefore, as the motor rotation speed difference increases, the maximum regenerative power increases. Meanwhile, as the target gearshift time increases, the thermal energy consumed by the clutch friction during the gearshift operation increases. Therefore, the maximum regenerative power is reduced. In addition, as the pressing torque increases, the thermal energy caused by the clutch friction increases, and the maximum regenerative power is reduced.

The maximum inertia phase regenerative power calculated in the maximum inertia phase regenerative power calculation block B104 and the absorbable power calculated in step S33 of FIG. 7 are input to the substantial absorbable power calculation block B105. In addition, in the substantial absorbable power calculation block B105, the substantial absorbable power that can be absorbed substantially is calculated by subtracting the maximum inertia phase regenerative power from the absorbable power.

The substantial absorbable power calculated in the substantial absorbable power calculation block B105 and the output power determined from the output voltage of the fuel cell stack 110 and the detection value of the output current are input to the block B106 for determining generated power reduction during gearshift operation. In the block B106 for determining generated power reduction during gearshift operation, the substantial absorbable power and the output power are compared. In addition, in the block B106 for determining generated power reduction during gearshift operation, when the output voltage is higher than the substantial absorbable power, it is determined that the generated power reduction is necessary. When the output voltage is equal to or lower than the substantial absorbable power, it is determined that the generated power reduction is not necessary. In addition, when the output voltage is higher than the substantial absorbable power, step S90 of FIG. 4 is processed, and this routine is terminated. Otherwise, if the output voltage is equal to or lower than the substantial absorbable power, the process advances to step S120.

In step S120, the controller 300 determines whether or not a gearshift progression degree is lower than a predetermined value. Specifically, it is determined whether or not an actual gearshift ratio obtained by dividing the motor rotation speed by the output rotation speed of the transmission 230 is smaller than a predetermined threshold value set to be slightly larger than the gearshift ratio subsequent to the upshift operation (=gearshift ratio of the second gear).

Here, the actual gearshift ratio obtained by dividing the motor rotation speed by the output rotation speed of the transmission 230 means an inertia phase progression degree. Therefore, if the actual gear reduction ratio is reduced from the gearshift ratio prior to the upshift operation to the vicinity of the gearshift ratio subsequent to the upshift operation, it can be determined that the inertia phase is terminated. In addition, if it is determined that the inertia phase is terminated in this manner, step S90 is progressed, and this routine is terminated.

Otherwise, if it is determined that the gearshift progression degree is lower than the predetermined value, that is, the operation is under the inertia phase, the controller 300 processes step S130.

Here, according to this embodiment, the controller 300 sets the target value of the stack supply flow rate to the target value for the inertia phase (hereinafter, also referred to as an "inertia phase stack supply flow rate target value"), and reduces the generated power from the basic target value to the target value for the inertia phase (hereinafter, also referred to as an "inertia phase power target value"). The control of this controller 300 will now be described in details.

Figure 16:
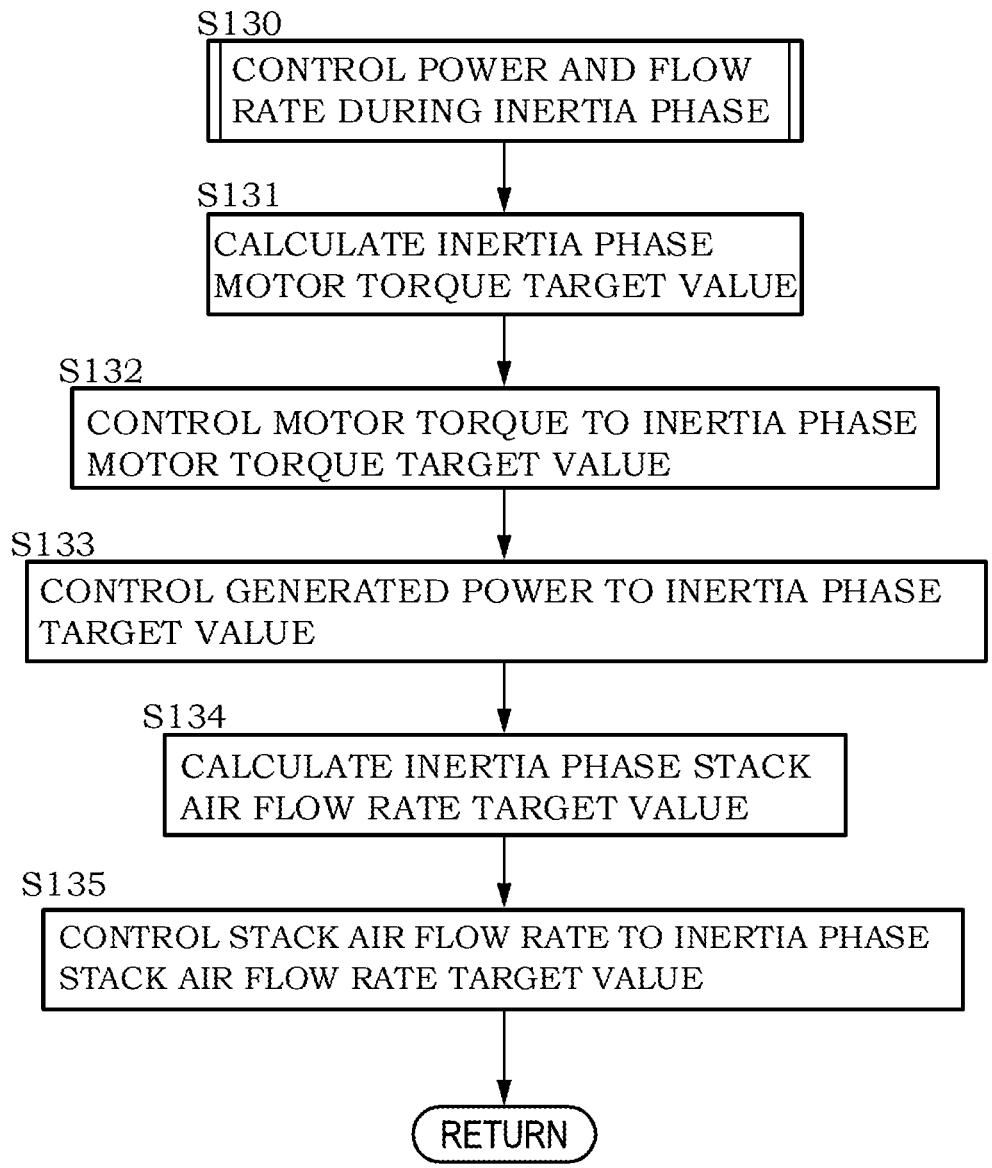
FIG. 16 is a flowchart illustrating a control for the output power and the stack supply flow rate during an inertia phase.

FIG. 16 is a flowchart illustrating a control for the power and the flow-rate during the inertia phase in details.

In step S131, the controller 300 calculates a target value of the motor torque during the inertia phase of the upshift operation (hereinafter, also referred to as an "inertia phase motor torque target value"). Specifically, the larger one of the predetermined target regenerative torque and the motor torque lower limit value stored in the ROM in advance to reduce the motor rotation speed is calculated as the motor torque target value.

In step S132, the controller 300 performs a gearshift power control for reducing the rotation speed of the drive motor 210 using the inverter 220 and controls the motor torque to the inertia phase motor torque target value calculated in step S131.

Figure 17:
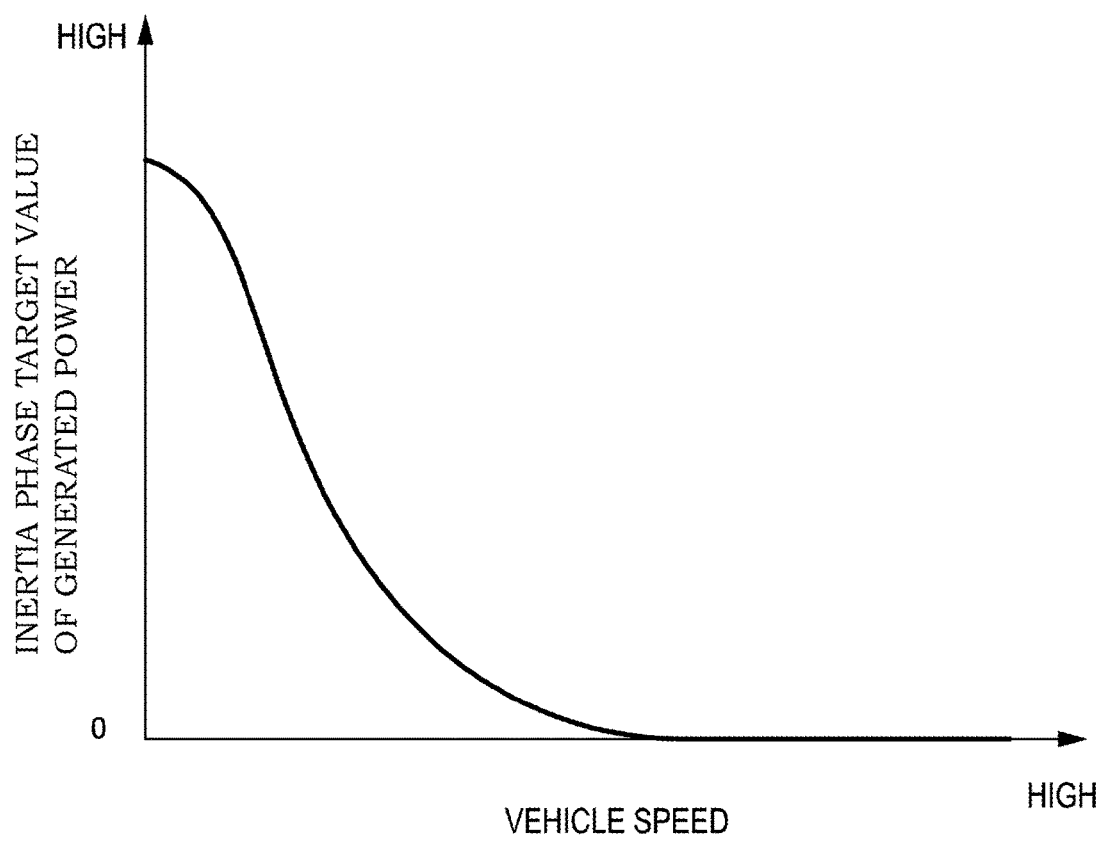
FIG. 17 is a map illustrating a relationship between a vehicle speed and an inertia phase target value of the generated power.

In step S133, the controller 300 calculates the inertia phase target value of the generated power and controls the generated power to the inertia phase target value on the basis of the vehicle speed with reference to the table of FIG. 17. Note that, as recognized from FIG. 17, the inertia phase target value of the generated power is set to decrease as the vehicle speed increases.

Here, the motor rotation speed difference before and after the gearshift operation increases as the vehicle speed increases (refer to the block B102 of FIG. 15). In addition, as the vehicle speed increases, and the motor rotation speed difference before and after a gearshift operation of the motor rotation speed increases, the decrease of the motor rotation speed during the inertia phase becomes significant. Therefore, as the vehicle speed increases, the regeneration amount of the drive motor 210 during the inertia phase increases, so that it is necessary to reduce the generated power. Therefore, the inertia phase target value of the generated power is set to decrease as the vehicle speed increases. Alternatively, the inertia phase target value of the generated power may be set to zero regardless of the vehicle speed.

The inertia phase target value of the generated power is set to be smaller than the basic target value of the generated power. In addition, according to this embodiment, the target value of the output current (hereinafter, also referred to as an "inertia phase current target value") is obtained and set on the basis of the inertia phase target value of the generated power with reference to the I-V characteristic of the fuel cell stack 110.

In step S134, the controller 300 calculates the target value of the stack supply flow rate during the inertia phase of the upshift operation (hereinafter, also referred to as an "inertia phase stack supply flow rate target value").

According to this embodiment, this inertia phase stack supply flow rate target value may be set arbitrarily such that the HFR value does not become excessively high, that is, the electrolyte membrane of the fuel cell 10 of the fuel cell stack 110 is not excessively dried, and the HFR value does not remarkably decrease in response to a decrease of the output current.

However, according to this embodiment, the inertia phase stack supply flow rate target value is preferably set to be equal to the basic target value of the stack supply flow rate which is the stack supply flow rate target value immediately prior to transition to the inertia phase.

In step S135, the controller 300 performs the control such that the stack supply flow rate is set to the inertia phase stack supply flow rate target value calculated in step S134.

Specifically, first, the controller 300 calculates a target value of the air pressure in the inertia phase (hereinafter, also referred to as an "inertia phase air pressure target value") on the basis of the inertia phase current target value calculated in step S133.

The controller 300 calculates the target value of the compressor supply flow rate in the inertia phase (hereinafter, also referred to as an "inertia phase compressor flow rate target value") on the basis of the inertia phase current target value.

The controller 300 controls the opening level of the cathode pressure control valve 126, the bypass valve 128, and the torque of the compressor 124 such that the air pressure detection value of the cathode pressure sensor 303, the compressor supply flow rate detection value of the first air flow sensor 301, and the stack supply flow rate detection value of the second air flow sensor 302 are set to the inertia phase air pressure target value, the inertia phase compressor flow rate target value, and the inertia phase stack supply flow rate target value, respectively.

Note that, when the inertia phase stack supply flow rate target value is set to be equal to the basic target value of the stack supply flow rate which is the stack supply flow rate target value immediately prior to transition to the inertia phase as described above, it is not necessary to change control states of the opening level of the cathode pressure control valve 126, the bypass valve 128, and the torque of the compressor 124. Therefore, in this case, it is possible to omit the control of the pneumatic system including the compressor 124 to change the stack supply flow rate even in the inertia phase. Therefore, it is possible to reliably prevent influence of the response delay of the pneumatic system.

Effects of the aforementioned fuel cell vehicle control method according to this embodiment will be described.

Figure 19:
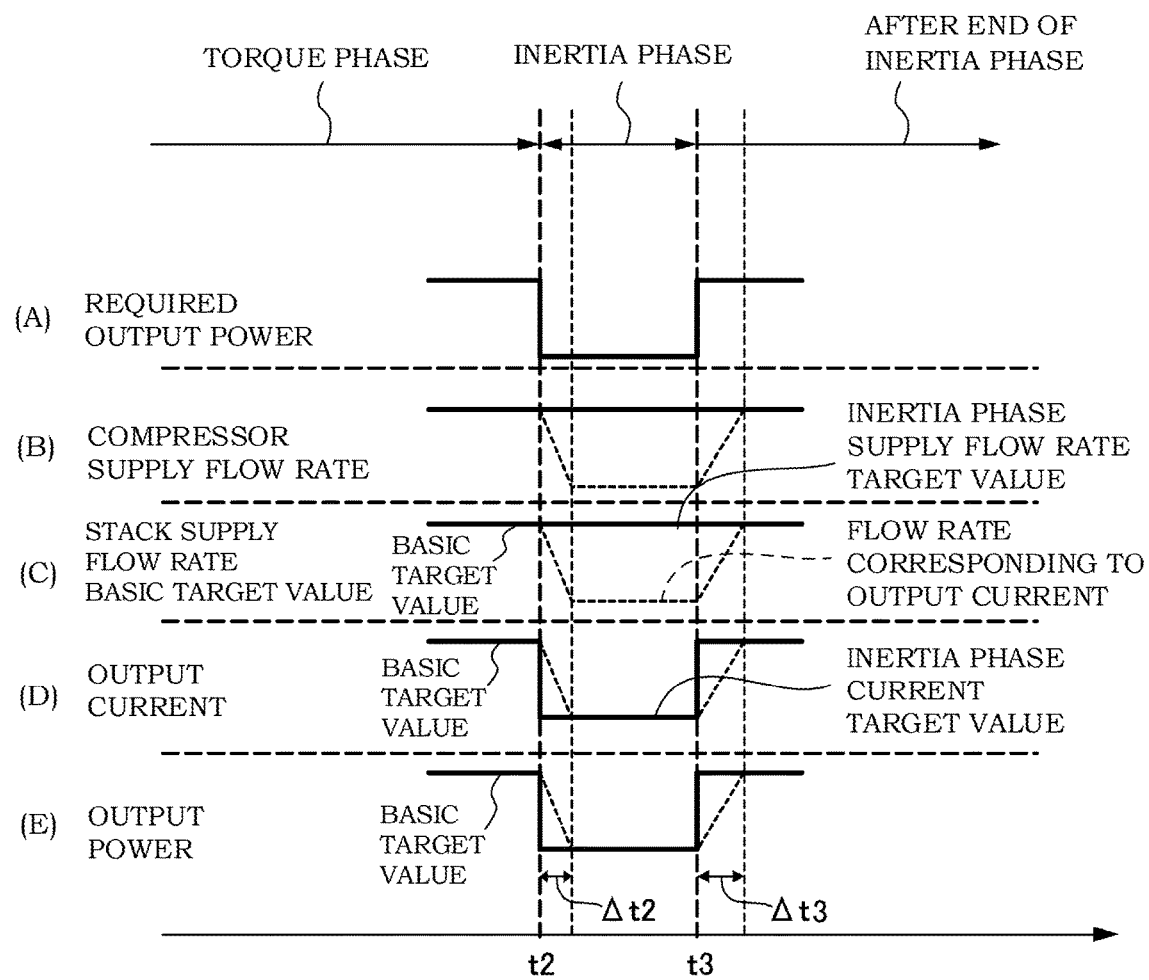
FIG. 19 is a timing chart illustrating a change of the stack supply flow rate or the output current target value during the inertia phase.

FIG. 19 is a timing chart illustrating an exemplary operation during the inertia phase in the fuel cell vehicle control method according to this embodiment. Note that, in FIG. 19, the control of the prior art is indicated by the dotted lines for reference. In addition, in FIG. 19, a description will be made for a case where the inertia phase stack supply flow rate target value is set to be equal to the basic target value of the stack supply flow rate which is the stack supply flow rate target value immediately prior to transition to the inertia phase, that is, a case where the compressor supply flow rate or the stack supply flow rate does not change in the inertia phase.

As illustrated in FIG. 19(A), at the inertia phase start timing t2, the operation advances from the torque phase to the inertia phase. As described above, as the operation advances to the inertia phase, the power that can be absorbed by the battery 160, the vehicle auxiliary machinery 180, and the drive motor 210 is reduced. Therefore, the required generated power is reduced. Therefore, as illustrated in FIG. 19(E), the output power of the fuel cell stack 110 is reduced to the inertia phase power target value. This output power reduction is maintained during the inertia phase, that is, from the inertia phase start timing t2 to the inertia phase end timing t3.

According to this embodiment, as described above, in order to set the output power to be close to the inertia phase power target value, the output voltage is adjusted by the DC/DC converter 170, and the output current of the inertia phase start timing t2 is reduced to the inertia phase current target value (refer to FIG. 19(D)). Note that this inertia phase current target value is maintained during the inertia phase period t2 to t3.

Here, in the control of the prior art, the output current of the inertia phase start timing t2 is not instantly reduced as indicated by the dotted lines in FIGS. 19(D) and 19(E), but is slowly reduced for a predetermined period of time Δt2. In addition, even at the inertia phase end timing t3, the output current is not instantly recovered, but is recovered for a predetermined period of time Δt3.

In this manner, in the prior art, the output current is changed for a predetermined period of time at the start or end of the inertia phase considering the response delay of the pneumatic system including the compressor 124.

That is, the response speed of the pneumatic system including the compressor 124 is lower than the response speed of the power/current control. Therefore, even when a command for changing the output of the compressor 124 is issued at the inertia phase start timing t2 and the inertia phase end timing t3, a time lag occurs until the stack supply flow rate changes in practice. Accordingly, the output current also changes for the predetermined periods of time Δt2 and Δ3 depending on the time lags Δt2 and Δt3. However, when the output current changes for a predetermined period of time in this manner, the inertia phase is delayed (in the example of FIG. 19, at least a delay of Δt3 occurs). As a result, this increases the gearshift time of the upshift operation.

In this regard, according to this embodiment, the inertia phase stack supply flow rate target value which is the target value of the stack supply flow rate during the inertia phase t2 to t3 is set to be equal to the basic target value of the stack supply flow rate which is the target value immediately prior to the inertia phase start timing t2. That is, the control state of the pneumatic system that brings a response delay does not change by preventing a change of the target value of the stack supply flow rate during the inertia phase t2 to t3. As a result, it is possible to prevent influence of the response delay of the pneumatic system during the inertia phase t2 to t3.

According to this embodiment, the target value of the output power that depends on the required output power is nearly instantly changed within a predetermined period of time by abruptly reducing the output current as indicated by the solid line of FIG. 19(E). Therefore, it is possible to change the output current without providing the time lags Δt2 and Δt3. Accordingly, it is possible to reduce the inertia phase period and prevent a delay of the gearshift time.

Using the method of controlling the fuel cell vehicle 1 according to this embodiment described above, it is possible to obtain the following effects.

The fuel cell vehicle control method according to this embodiment is executed using the fuel cell vehicle 1 including the fuel cell stack 110 having fuel cells, the compressor 124 which is an air supply device for supplying air to the fuel cell stack 110, the drive motor 210 that drives the fuel cell vehicle 1 using the power from the fuel cell stack 110, and the transmission 230 provided in a power transmission passage between the drive motor 210 and the drive wheel 250. In this fuel cell vehicle control method, the output current changes depending on the required generated power (required output power) of the fuel cell stack 110, and the air supply flow rate of the compressor 124 is adjusted depending on the change of the output current. In addition, when the gearshift operation of the transmission 230 is under the inertia phase of the upshift operation, the output current is reduced in response to a decrease of the required generated power of the fuel cell stack 110 (FIG. 19(D)). In addition, the air supply flow rate is controlled to the inertia phase supply flow rate higher than the air supply flow rate (indicated by the dotted line of FIG. 9(C)) depending on the decrease of the output current (step S135 of FIG. 16 and FIG. 19(C)).

According to this embodiment, even when the output current decreases as the required generated power of the fuel cell stack 110 decreases due to a decrease of the power that can be supplied to the drive motor 210 or the like in the inertia phase of the upshift operation, the air is supplied to the fuel cell stack 110 on the basis of the inertia phase supply flow rate instead of the supply flow rate determined depending on the decrease of the output current (refer to FIG. 19(C)) lower than the inertia phase supply flow rate. Therefore, unlike the prior art, a remarkable decrease of the stack supply flow rate caused by the decrease of the output current in the inertia phase is not necessary. Accordingly, it is possible to suppress a delay of the gearshift time caused by the response delay of the pneumatic system.

Note that, if the air is supplied at a supply flow rate higher than that determined depending on the decrease of the output current, the electrolyte membrane of the fuel cell 10 may be excessively dried, or an overvoltage may occur. However, according to this embodiment, the supply flow rate increases only in the inertia phase of the upshift operation which is relatively short. Therefore, it is possible to remarkably suppress frequent occurrence of drying or overvoltage in the electrolyte membrane.

According to the first embodiment, the inertia phase supply flow rate is controlled to a target value equal to the target value of the supply air flow rate immediately prior to transition to the inertia phase (inertia phase stack supply flow rate target value) (FIG. 9(C)). As a result, it is possible to omit the control of the pneumatic system such as output adjustment of the compressor 124 in the inertia phase. Therefore, it is possible to reliably exclude influence of the response delay of the compressor 124.

In the fuel cell vehicle control method according to the first embodiment, since it is possible to omit the control of the pneumatic system such as output adjustment of the compressor 124 or the like in the inertia phase as described above, it is not necessary to consider the control of the pneumatic system in order to change the output current. Therefore, according to the first embodiment, it is possible to change the output current within a predetermined period of time (approximately instantly) depending on the inertia phase start timing t1 and the inertia phase end timing t2 (refer to FIG. 19(D)). As a result, reduction or recovery of the output current of the fuel cell stack 110 occurs nearly instantly. This contributes to reduction of the gearshift time.

According to the first embodiment, when the output power of the fuel cell stack 110 is higher than the substantial absorbable power obtained by subtracting the maximum regenerative power of the drive motor 210 from the power suppliable to a load of the fuel cell stack 110 other than the drive motor 210 (such as the battery 160 and the vehicle auxiliary machinery 180), it is determined that reduction of the required generated power of the fuel cell stack 110 occurs, and the output current is reduced (step S110 of FIG. 4 and block B106 of FIG. 15).

Alternatively, determination on whether or not the generated power is reduced in step S110 may be performed before determination on whether or not the operation is under the inertia phase in step S100.

Second Embodiment

Next, a second embodiment of the present invention will be described. According to this embodiment, in addition to the processing of the first embodiment, a HFR correction process for increasing the HFR of the electrolyte membrane of the fuel cell 10 is performed when it is predicted that the gearshift operation of the transmission is transitioned to the upshift operation or when it is determined that the upshift operation is being executed. Note that, in each embodiment described below, like reference numerals denote like elements as in the first embodiment described above, and they will not be described repeatedly as appropriate.

Here, in the first embodiment, during the inertia phase, the inertia phase supply flow rate target value is set as the target value of the stack supply flow rate. Therefore, in this case, there is a possibility that the air supplied to the fuel cell stack 110 becomes excessive, and the electrolyte membrane of the fuel cell 10 of the fuel cell stack 110 is excessively dried. In this regard, according to this embodiment, the control is executed to suppress such overdrying of the electrolyte membrane when transition to the upshift operation is predicted, or it is determined that the upshift operation is being executed.

Figure 20:
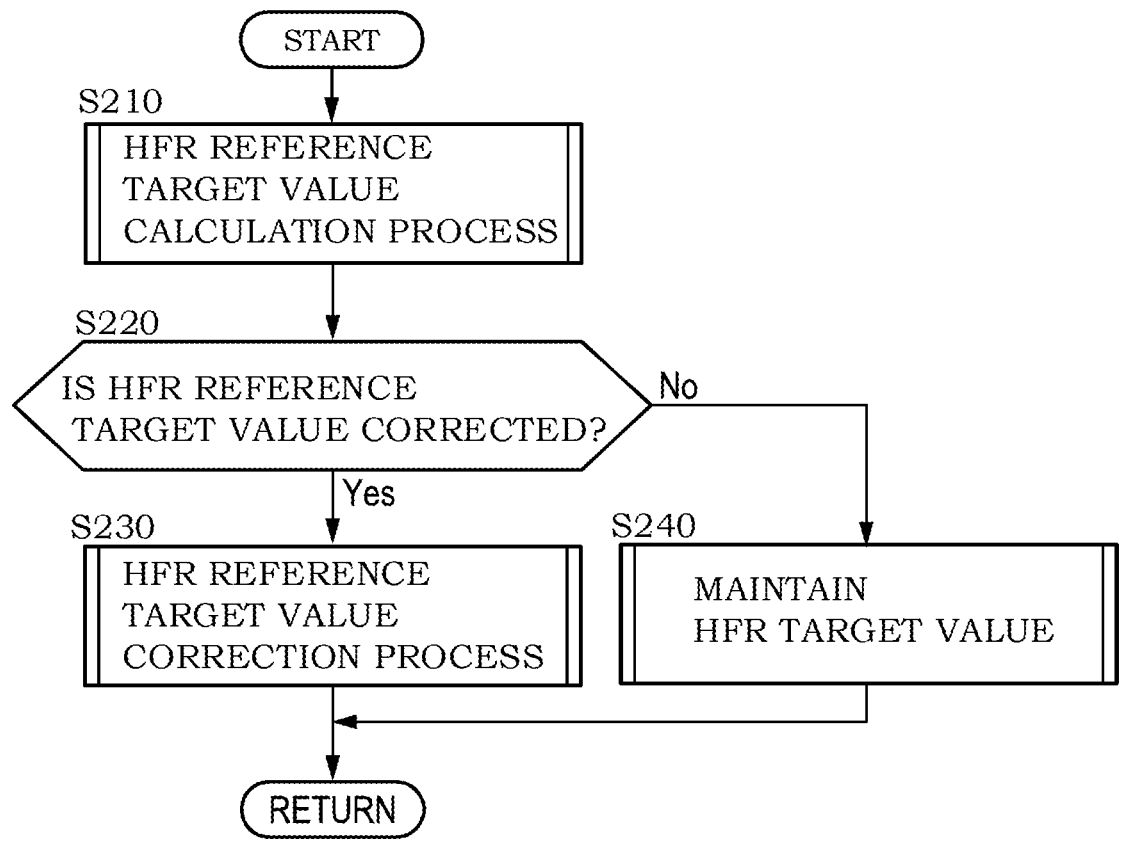
FIG. 20 is a flowchart illustrating an HFR control according to a second embodiment of the invention.

FIG. 20 is a flowchart illustrating an HFR control according to this embodiment. Note that this processing is performed in parallel with or independently from the processing of FIG. 4 of the first embodiment.

As illustrated in FIG. 20, in step S210, the controller 300 performs an HFR reference target value calculation process. Specifically, first, the basic target value of the generated power is calculated using the same method as that of step S50 (FIG. 10) described above. In addition, as indicated in the HFR reference target value calculation block B201 of FIG. 22 described below, the HFR obtained from this basic target value of the generated power, for example, using a map representing a relationship between the generated power and the HFR prepared in advance is set as the HFR reference target value.

In step S220, the controller 300 determines whether or not the HFR reference target value is corrected.

Figure 21:
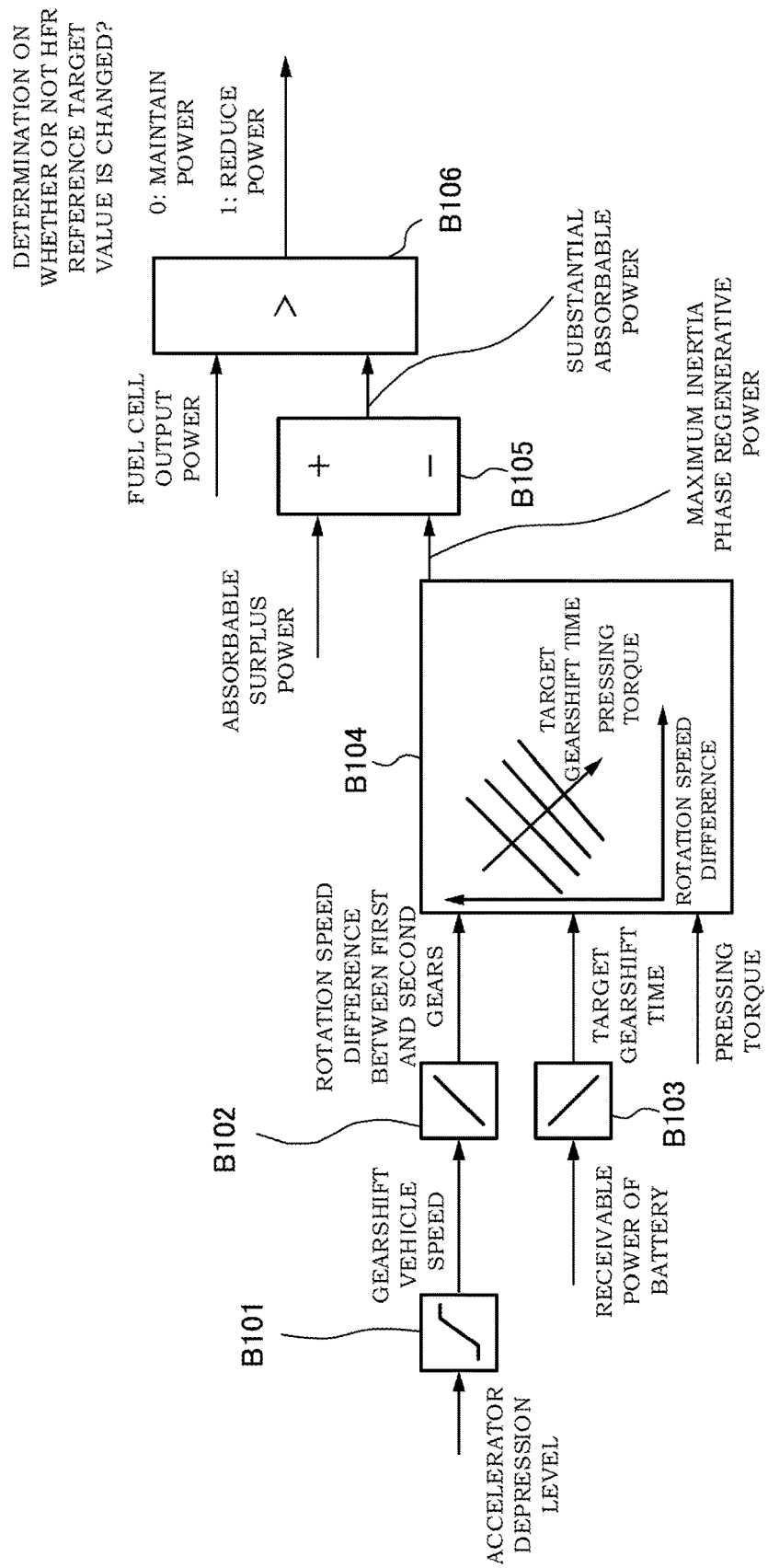
FIG. 21 is a block diagram illustrating a flow for determining whether or not the HFR reference target value is corrected.

FIG. 21 is a block diagram illustrating a flow of determining whether or not the HFR reference target value is corrected. As illustrated in FIG. 21, determination on whether or not the HFR reference target value is corrected according to this embodiment is similar to determination on whether or not the generated power is reduced during the gearshift operation of the first embodiment described in conjunction with FIG. 15. Therefore, each block B101 to B106 similar to those will not be described for simplicity purposes.

Therefore, according to the second embodiment, if the output voltage of the fuel cell stack 110 is higher than the substantial absorbable power based on the power consumed by the vehicle auxiliary machinery 180 and the power receivable by the battery 160, the controller 300 determines that transition to the upshift operation is predicted, or the upshift operation is being executed, so that it is determined that the correction of the HFR reference target value is necessary. If the output voltage is equal to or lower than the substantial absorbable power, the controller 300 determines that transition to the upshift operation is not predicted, and the correction of the HFR reference target value is not necessary.

If it is determined that the correction of the HFR reference target value is necessary, the process advances to the HFR reference target value correction process of step S230 of FIG. 20. Otherwise, if it is determined that the correction of the HFR reference target value is not necessary, the process advances to step S240. Then, the process is terminated while the HFR target value is maintained at the HFR reference target value. The HFR reference target value correction process of step S230 will now be described in details.

Figure 22:
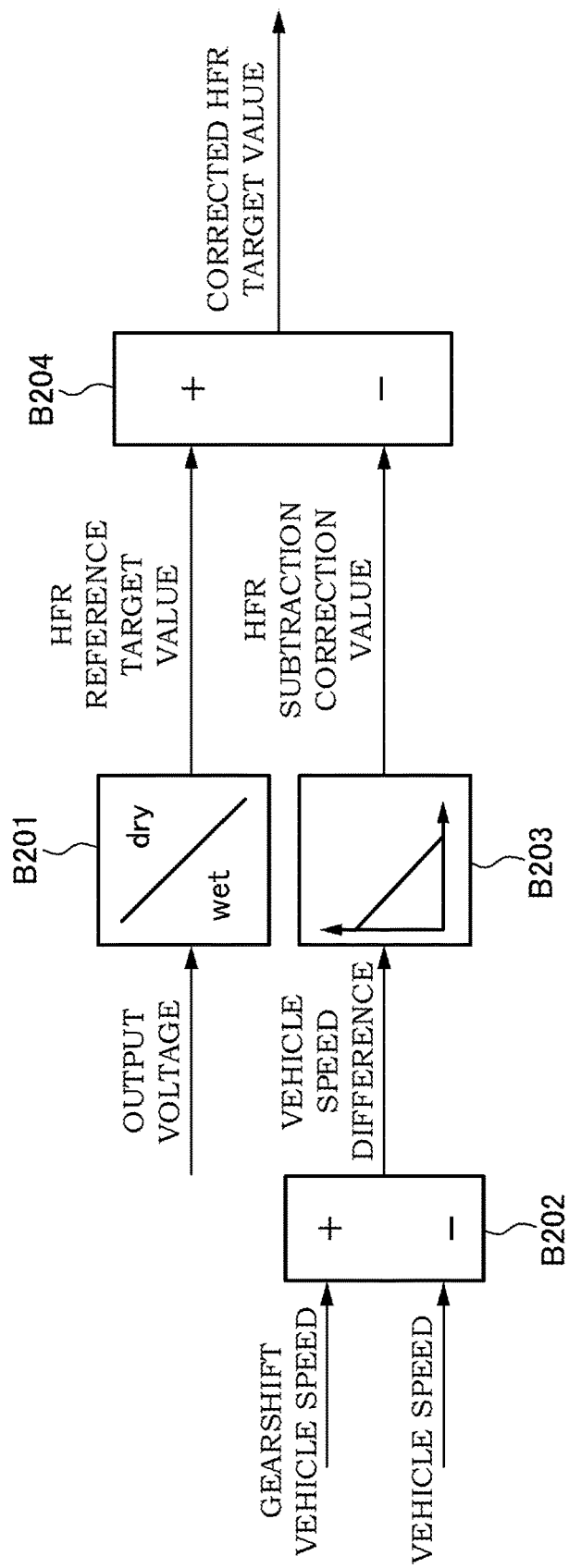
FIG. 22 is a block diagram illustrating a flow of a HFR correction process.

FIG. 22 is a block diagram illustrating a flow of correction of the HFR reference target value. This block includes an HFR reference target value calculation block B201, a vehicle speed difference calculation block B202, an HFR subtraction correction value calculation block B203, and a corrected HFR target value calculation block B204.

The output voltage of the fuel cell stack 110 is input to the HFR reference target value calculation block B201. In addition, the HFR reference target value calculation block B201 calculates the HFR reference target value from the output voltage of the fuel cell stack 110 on the basis of a map representing a relationship between the generated power and the HFR set in advance. Note that, typically, since it is necessary to more wet the electrolyte membrane as the output voltage increases, the HFR reference target value decreases as the output voltage increases on this map representing a relationship between the generated power and the HFR.

The gearshift vehicle speed calculated in the gearshift vehicle speed calculation block B101 of FIG. 15 and the current vehicle speed determined on the basis of the accelerator depression level detected by the accelerator stroke sensor 310 are input to the vehicle speed difference calculation block B202. In the vehicle speed difference calculation block B202, the vehicle speed difference is calculated by subtracting the current vehicle speed from the gearshift vehicle speed.

The vehicle speed difference calculated in the vehicle speed difference calculation block B202 is input to the HFR subtraction correction value calculation block B203. In addition, in the HFR subtraction correction value calculation block B203, the HFR subtraction correction value is calculated from the vehicle speed difference on the basis of a correction value map representing a relationship between the vehicle speed difference set in advance and the HFR subtraction correction value.

Here, the vehicle speed difference refers to a difference between the gearshift vehicle speed and the current vehicle speed. Therefore, if this vehicle speed difference value is relatively small, it can be determined that the current vehicle speed is close to the gearshift vehicle speed, and transition to the upshift speed change operation is near. Otherwise, if the vehicle speed difference value is relatively large, it can be determined that transition to the upshift speed change operation is still far. In addition, if the vehicle speed difference is substantially zero, it can be determined that the current state is under the upshift operation.

Therefore, when the vehicle speed difference has a relatively small value on the correction value map, and transition to the upshift operation is near, or the upshift operation is being executed, the calculated HFR subtraction correction value becomes relatively large in order to more wet the electrolyte membrane. In particular, when the vehicle speed difference is zero, the HFR subtraction correction value has a maximum value.

Meanwhile, when the vehicle speed difference has a relatively large value, and it can be determined that transition to the upshift operation is still far, necessity of immediately wetting the electrolyte membrane is insignificant. Therefore, in this case, the HFR subtraction correction value is calculated to a relatively small value in order not to significantly change the HFR reference target value. In particular, when the vehicle speed difference is larger than a predetermined level, the HFR subtraction correction value is set to zero.

The HFR reference target value calculated in the HFR reference target value calculation block B201 and the HFR subtraction correction value calculated in the HFR subtraction correction value calculation block B203 are input to the corrected HFR target value calculation block B204. In the corrected HFR target value calculation block B204, the corrected HFR target value is calculated by subtracting the HFR subtraction correction value from the HFR reference target value.

Therefore, according to this embodiment, when the output voltage of the fuel cell stack 110 is higher than the substantial absorbable power, transition to the upshift operation is predicted or it is determined that the upshift operation is being executed, and it is determined that correction of the HFR reference target value is necessary as described above, the HFR value of the electrolyte membrane is controlled on the basis of the corrected HFR target value smaller than the HFR reference target value, which means a wetter state. As a result, even when the stack supply flow rate becomes excessive during the inertia phase of the upshift operation, as described above, it is possible to effectively prevent overdrying of the electrolyte membrane.

Figure 23:
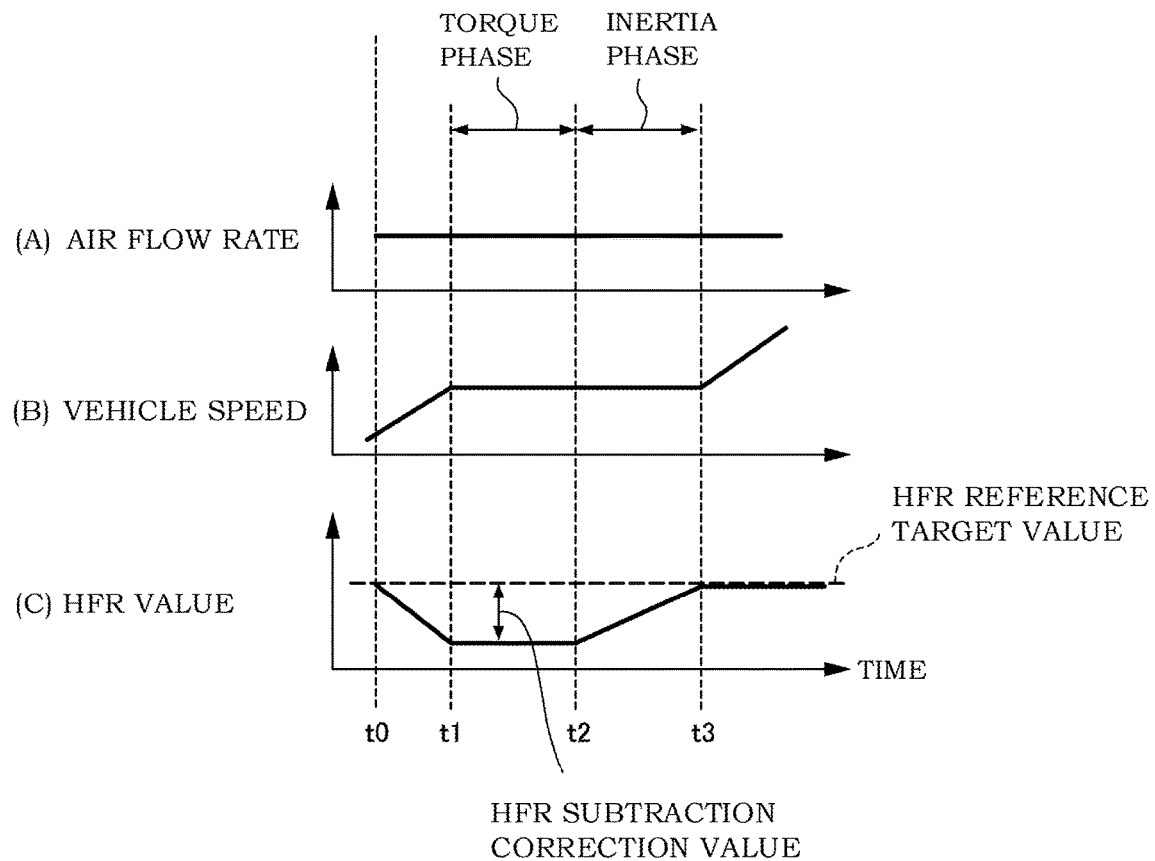
FIG. 23 is a timing chart illustrating an exemplary change of an HFR value according to an embodiment of the invention.

FIG. 23 is a timing chart illustrating an exemplary change of an HFR value according to this embodiment. In FIG. 23, it is assumed that transition to the upshift operation is predicted at the timing t0 prior to transition to the torque phase, and the corrected HFR target value is set.

As illustrated in FIG. 23, the HFR value decreases at the timing t0 in which the corrected HFR target value is set, and the HFR value is set to the corrected HFR target value at the torque phase start timing t1. Therefore, at the inertia phase start timing t2, the HFR value becomes smaller than the HFR reference target value (wetter state). As a result, even when the stack supply flow rate becomes excessive, and the HFR value increases at the inertia phase execution timing t2 to t3, it is possible to suppress the HFR value from exceeding the HFR reference target value as illustrated in FIG. 23. Therefore, it is possible to prevent overdrying of the electrolyte membrane.

Using the method of controlling the fuel cell vehicle 1 according to this embodiment described above, it is possible to obtain the following effects.

In the fuel cell vehicle control method according to this embodiment, when transition to the upshift operation of the transmission 230 is predicted, or it is determined that the upshift operation is being executed, the HFR correction process (FIG. 22) for reducing the HFR value of the electrolyte membrane of the fuel cell stack 110 is performed. As a result, by setting the inertia phase supply flow rate target value as the target value of the stack supply flow rate, it is possible to effectively prevent overdrying of the electrolyte membrane even when the stack supply flow rate becomes excessive during the inertia phase.

In the fuel cell vehicle control method according to this embodiment, when the output power of the fuel cell stack 110 is higher than the substantial absorbable power obtained by subtracting the maximum regenerative power of the drive motor 210 from the power suppliable to a load of the fuel cell stack 110 other than the drive motor 210 (such as the battery 160 and the vehicle auxiliary machine 180), it is determined that transition to the upshift operation is predicted, or the upshift operation is being executed, and the HFR correction process is executed (FIG. 21). As a result, it is possible to execute the HFR correction process when the stack supply flow rate becomes excessive, and overdrying is expected in the inertia phase.

Note that, according to this embodiment, when the output power of the fuel cell stack 110 is higher than the substantial absorbable power, it is determined that transition to the upshift operation is predicted, or the upshift operation is being executed. Alternatively, the method of determining whether or not transition to the upshift operation is predicted, or the upshift operation is being executed is not limited thereto. For example, it may be determined that the upshift operation is predicted, or the upshift operation is being executed when the vehicle speed difference is equal to or smaller than a predetermined value.

Third Embodiment

A third embodiment of the present invention will now be described. According to this embodiment, an HFR correction process different from that of the second embodiment is employed. Note that the configuration of this embodiment is similar to that of the second embodiment except for the calculation method. Therefore, like reference numerals denote like elements as in the second embodiment, and they will not be described repeatedly.

According to this embodiment, in the HFR correction process, the HFR value of the electrolyte membrane is reduced as the vehicle speed difference as a difference between the vehicle speed of the fuel cell vehicle 1 and the gearshift vehicle speed decreases.

Figure 24:
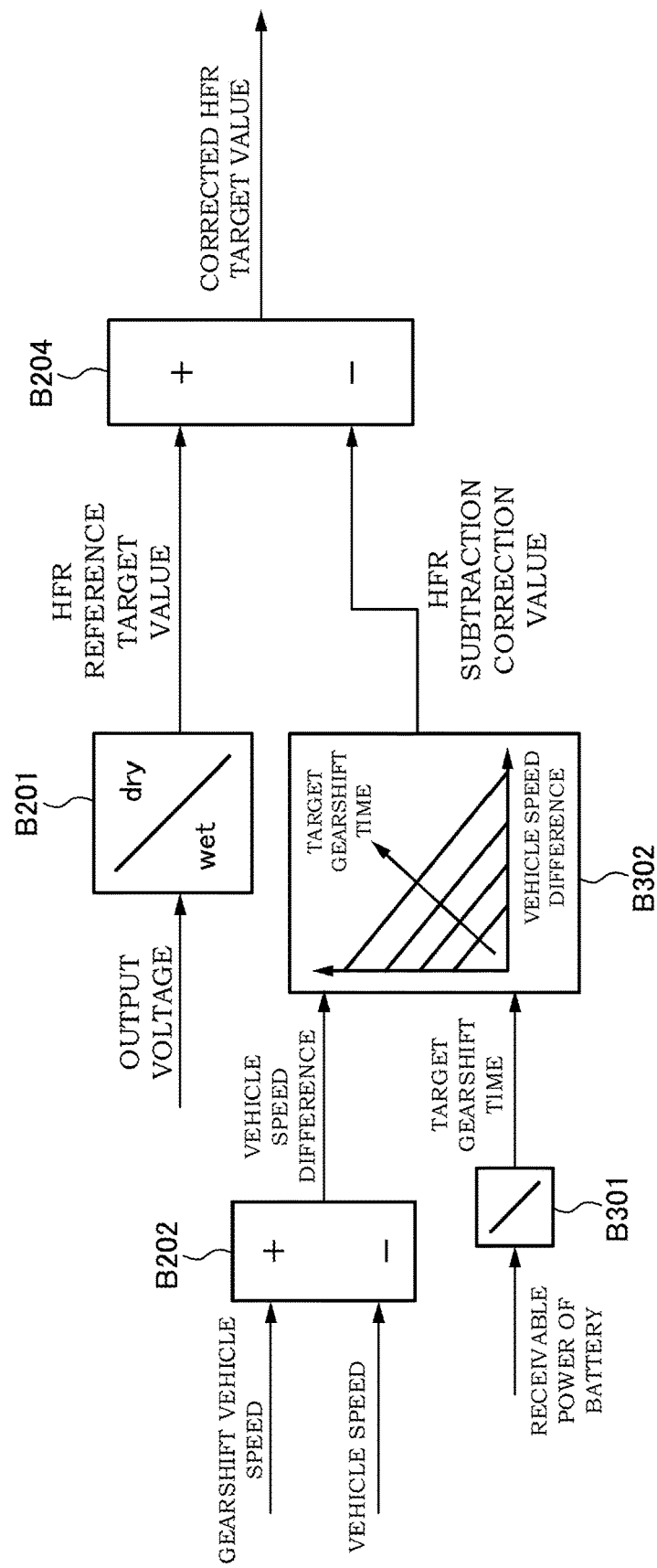
FIG. 24 is a block diagram illustrating a flow of the HFR correction process according to a third embodiment of the invention.

FIG. 24 is a block diagram illustrating a flow of calculating the corrected HFR target value according to the third embodiment of the invention. This block includes an HFR reference target value calculation block B201, a vehicle speed difference calculation block B202, a target gearshift time calculation block B301, an HFR subtraction correction value calculation block B302, and a corrected HFR target value calculation block B204.

Similar to the second embodiment, in the HFR reference target value calculation block B201, the HFR reference target value is calculated on the basis of the output voltage of the fuel cell stack 110. Similar to the second embodiment, in the vehicle speed difference calculation block B202, the vehicle speed difference is calculated by subtracting the current vehicle speed from the gearshift vehicle speed.

The target gearshift time calculation block B301 has the same function as that of the target gearshift time calculation block B103 of the first embodiment described in conjunction with FIG. 15. In the target gearshift time calculation block B301, the target gearshift time is calculated from the receivable power of the battery 160.

The vehicle speed difference calculated in the vehicle speed difference calculation block B202 and the target gearshift time calculated in the target gearshift time calculation block B301 are input to the HFR subtraction correction value calculation block B302 according to this embodiment.

In the HFR subtraction correction value calculation block B302, the HFR subtraction correction value is calculated from the vehicle speed difference and the target gearshift time on the basis of a map prepared in advance.

Here, according to this embodiment, when the vehicle speed difference is relatively small, it can be determined that transition to the upshift operation is near, or the upshift operation is being executed. Therefore, on the aforementioned map, as the vehicle speed difference decreases, the HFR subtraction correction value increases so as to more wet the electrolyte membrane. Meanwhile, as the target gearshift time increases, there is a possibility that the state in which the stack supply flow rate is excessive is continuously maintained during the inertia phase. Therefore, as the target gearshift time increases, the HFR subtraction correction value increases to more wet the electrolyte membrane.

Similar to the second embodiment, in the corrected HFR target value calculation block B204, the corrected HFR target value is calculated by subtracting the HFR subtraction correction value from the HFR reference target value.

Using the method of controlling the fuel cell vehicle 1 according to this embodiment described above, it is possible to obtain the following effects.

According to this embodiment, in the HFR correction process (FIG. 24), the vehicle speed of the fuel cell vehicle 1 and the gearshift vehicle speed set as the vehicle speed during the gearshift operation are compared with each other (vehicle speed difference calculation block B202), and the HFR value of the electrolyte membrane is reduced as the difference between the vehicle speed of the fuel cell vehicle 1 and the gearshift vehicle speed decreases.

In this manner, by further reducing the HFR value of the electrolyte membrane (more wetting the electrolyte membrane) as the difference between the vehicle speed and the gearshift vehicle speed (vehicle speed difference) decreases, it is possible to more reliably wet the electrolyte membrane when transition to the upshift operation is near.

According to this embodiment, the HFR value is further reduced as the target gearshift time during the gearshift operation increases. As a result, it is possible to more reliably wet the electrolyte membrane when transition to the upshift operation is near.

Fourth Embodiment

A fourth embodiment of the present invention will now be described. According to this embodiment, in addition to the configuration of the second or third embodiment, a control for increasing the output power is performed by increasing the generated power of the fuel cell stack 110 during the torque phase of the upshift operation to be higher than the basic target value of the generated power during the torque phase. Note that like reference numerals denote like elements as in the second or third embodiment, and they will not be described repeatedly as appropriate.

Figure 25:
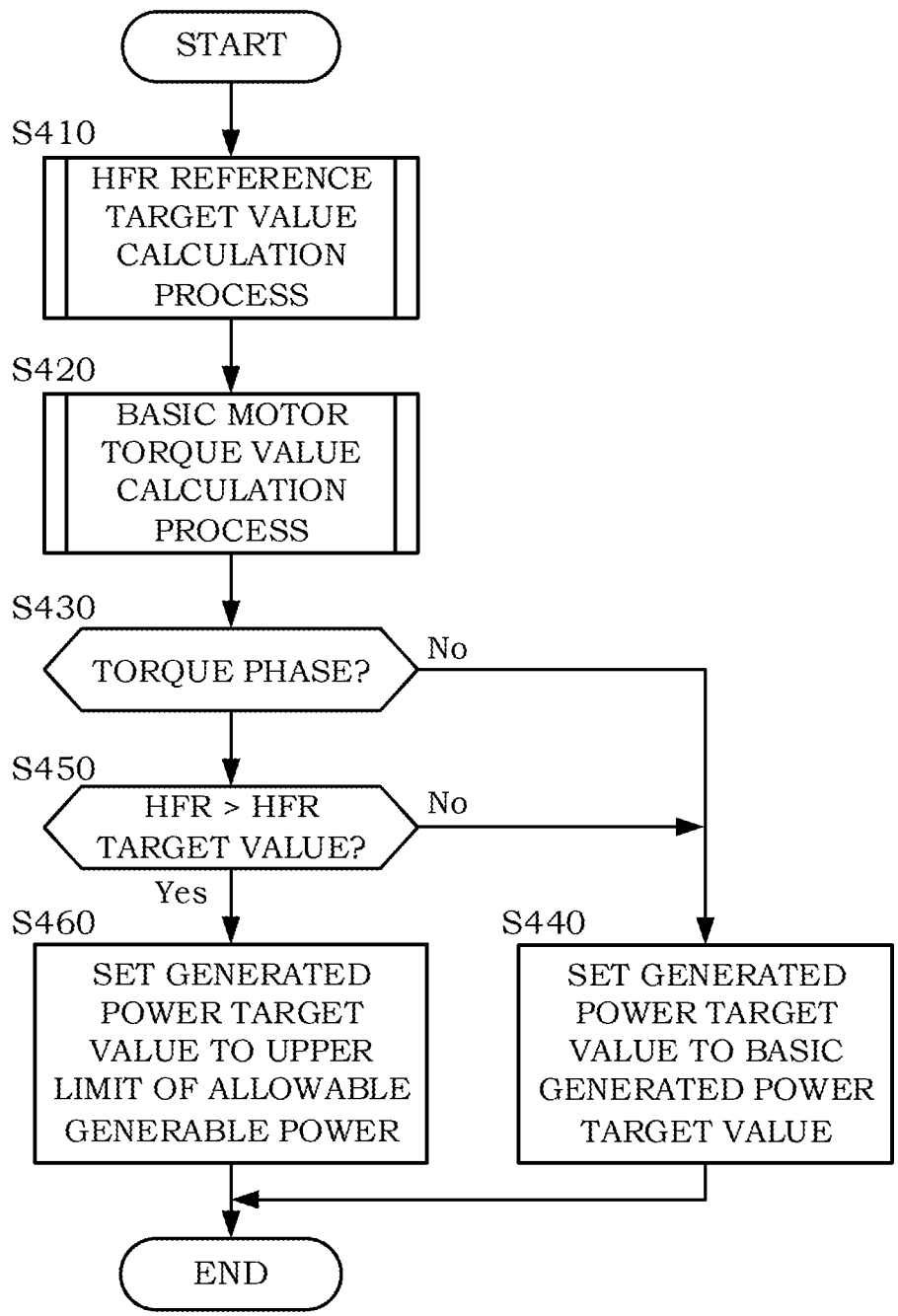
FIG. 25 is a flowchart illustrating a flow of a process of increasing torque phase output power according to a fourth embodiment of the invention.

FIG. 25 is a flowchart illustrating a flow of a process of increasing torque phase output power according to this embodiment.

In step S410, the HFR target value calculation process is performed. Similar to the second or third embodiment, in this HFR target value calculation process, the HFR reference target value or the corrected HFR target value is calculated and set as the HFR target value.

In step S420, a basic generated power target value calculation process is performed. This basic generated power target value calculation process is performed using the same method as that of FIG. 10.

In step S430, it is determined whether or not the current state is under the torque phase of the upshift operation. Specifically, it is determined whether or not the upshift speed change operation is being executed, for example, using the same method as that of step S80 of FIG. 4 of the first embodiment. In addition, if it is determined that the upshift speed change operation is being executed, and, for example, an actual gearshift ratio obtained by dividing the motor rotation speed by the output rotation speed of the transmission 230 is substantially equal to the gearshift ratio prior to the upshift operation (=gearshift ratio of the first gear), it is determined that the current state is under the torque phase. If it is determined that the actual gearshift ratio is different from the gearshift ratio prior to the upshift operation, it is determined that the current state is not under the torque phase.

If it is determined that the current state is not under the torque phase of the upshift operation, the process advances to step S440, and the target value of the generated power is set to the basic generated power target value calculated in step S420, so that this routine is terminated. Otherwise, if it is determined that current state is under the torque phase of the upshift operation, the process advances to step S450.

In step S450, it is determined whether or not the HFR detection value is higher than the HFR target value calculated in step S410. If it is determined that the detected HFR is lower than the HFR target value (that is, the electrolyte membrane is wetter, compared to the requirement), step S440 is processed. That is, in this case, it is determined that the electrolyte membrane is sufficiently wet, and it is not necessary to increase the generated power.

Meanwhile, if the HFR detection value is higher than the HFR target value calculated in step S410 (that is, the electrolyte membrane is drier, compared to the requirement), step S460 is processed.

In step S460, the target value of the generated power is set to an upper limit of allowable generable power higher than the basic generated power target value. That is, a process for improving generated power of the fuel cell stack 110 is performed.

Figure 26:
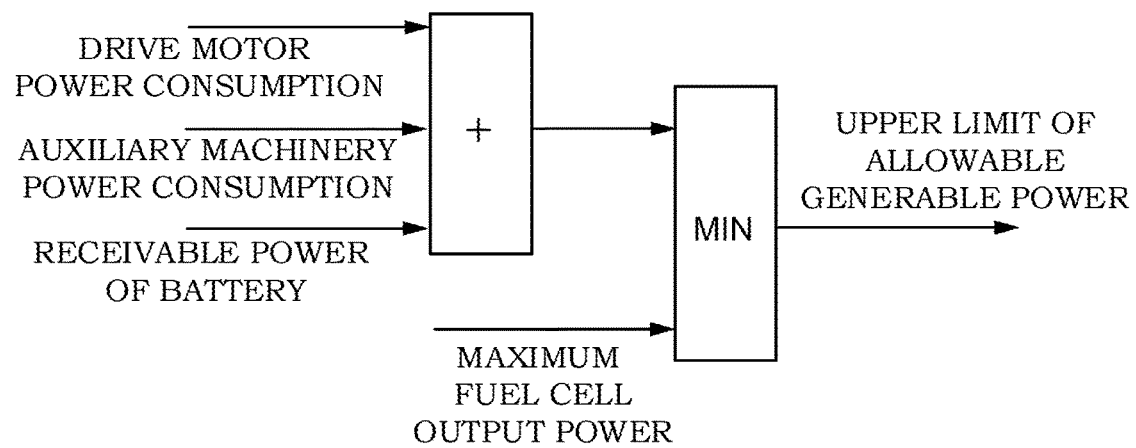
FIG. 26 is a block diagram illustrating a method of calculating an upper limit of allowable generable power.

FIG. 26 is a block diagram illustrating a method of calculating the upper limit of allowable generable power. As illustrated in FIG. 26, the upper limit of allowable generable power is set to the smaller one of a total sum of the power consumption of the drive motor 210, the power consumption of the vehicle auxiliary machinery 180, and the receivable power of the battery 160 and maximum output power of the fuel cell stack 110. That is, the upper limit of allowable generable power is set by considering a restriction of power absorbable by the drive motor 210, the vehicle auxiliary machinery 180, and the battery 160 and intending to output the power from the fuel cell stack 110 as high as possible.

In this manner, by setting the upper limit of allowable generable power so as to output power as high as possible from the fuel cell stack 110, it is possible to more wet the electrolyte membrane by increasing the generated water in the fuel cell 10 of the fuel cell stack 110 even when the current state is under the torque phase of the upshift operation, and the electrolyte membrane is dried. Therefore, it is possible to more effectively prevent overdrying of the electrolyte membrane even when the stack supply flow rate during the inertia phase becomes excessive.

Figure 27:
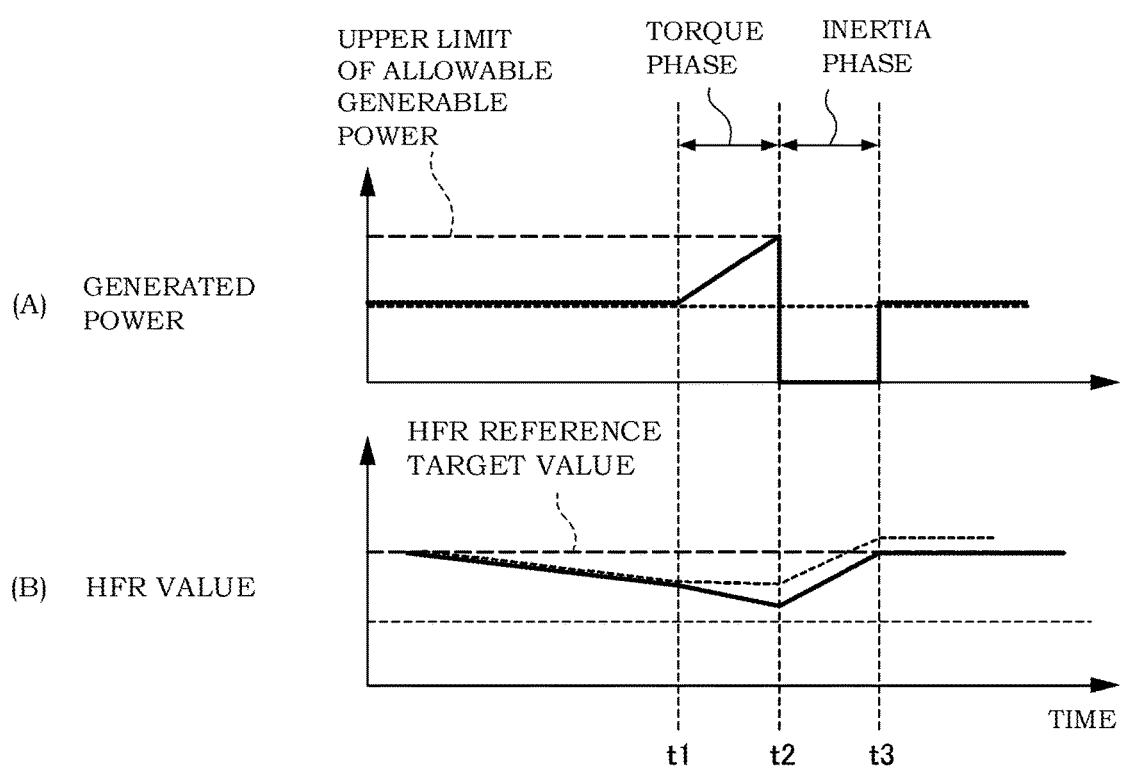
FIG. 27 is an exemplary timing chart illustrating a relationship between required generated power and the HFR value when a process of increasing the torque phase output power is performed.

FIG. 27 is an exemplary timing chart illustrating a relationship between the required generated power and the HFR value when a process of increasing the torque phase output power is performed according to the fourth embodiment. Note that, in FIG. 27, in order to clarify the functional effects, the required generated power and the HFR value in a case where the process of increasing the torque phase output power is not performed are indicated by the dotted lines.

In FIG. 27, until the torque phase start timing t1, electricity is generated in the fuel cell stack 110 on the basis of the basic generated power target value, and the HFR value gradually decreases due to influence of the generated water caused by this electricity generation. In addition, at the torque phase start timing t1, the upper limit of allowable generable power is set as the target value of the generated power. As a result, the reduction of the HFR value increases from the torque phase start timing t1, and the HFR value is further reduced at the inertia phase start timing t2 compared to a case where the process of increasing the torque phase output power is not performed (indicated by the dotted line). Therefore, at the inertia phase executing timing t2 to t3, it is possible to prevent the HFR value from exceeding the HFR reference target value even when the stack supply flow rate becomes excessive, and the HFR value increases. Therefore, it is possible to prevent overdrying of the electrolyte membrane.

Using the method of controlling the fuel cell vehicle 1 according to this embodiment described above, it is possible to obtain the following effects.

In the fuel cell vehicle control method according to this embodiment, the target value of the generated power during the torque phase of the upshift operation is set to the upper limit of allowable generable power which is an upper limit of the allowable value.

Accordingly, the output power of the fuel cell stack 11 during the torque phase increases. As the output power increases, the reaction in the fuel cell 10 is more promoted, and the generated water increases. As a result, it is possible to more wet the electrolyte membrane. Therefore, it is possible to more effectively prevent overdrying of the electrolyte membrane of the fuel cell 10 even when the stack supply flow rate during the inertia phase becomes excessive.

In the fuel cell vehicle control method according to this embodiment, the upper limit of allowable generable power is set as the target value of the generated power when the HFR value of the fuel cell stack 110 is lower than the reference target value of the HFR value. As a result, the upper limit of allowable generable power can be set when overdrying is expected. Therefore, it is possible to more appropriately prevent overdrying of the electrolyte membrane of the fuel cell 10.

While embodiments of the invention have been described hereinbefore, they are for illustrative purposes to show a part of applications of the invention and are not intended to limit the technical scope to such specific configurations. For example, in the first to fourth embodiments, the inertia phase supply flow rate is controlled to a target value equal to the target value of the supply air flow rate immediately prior to transition to the inertia phase (stack flow rate basic target value). Alternatively, the inertia phase supply flow rate target value may be changed from the stack flow rate basic target value as long as the influence of the response delay of the pneumatic system is insignificant, and a large delay is not generated in the gearshift time of the upshift operation.

The first to fourth embodiments described above may also be combined in any form.

The invention claimed is:

1. A fuel cell vehicle control method executed in a fuel cell vehicle having a fuel cell, an air supply device that supplies air to the fuel cell, a drive motor that drives a fuel cell vehicle using power from the fuel cell, and a transmission provided in a power transmission path between the drive motor and drive wheels, the method changing an output current depending on a required generated power of the fuel cell, and adjusting an air supply flow rate of the air supply device depending on the change of the output current, the method comprising:
    setting the required generated power of the fuel cell to power lower than the required generated power immediately prior to an inertia phase when a gearshift operation of the transmission is under the inertia phase of an upshift operation; and
    controlling the air supply flow rate to an inertia phase supply flow rate higher than the air supply flow rate set in response to a decrease of the output current of the fuel cell during the inertia phase.

2. The fuel cell vehicle control method according to claim 1, wherein the inertia phase supply flow rate is controlled to a target value identical to a target value of the supply air flow rate immediately prior to transition to the inertia phase.

3. The fuel cell vehicle control method according to claim 1, wherein
a HFR correction process for reducing an HFR value of an electrolyte membrane of the fuel cell is performed when it is predicted that the gearshift operation of the transmission is transitioned to an upshift operation, or it is determined that the upshift operation is being executed.

4. The fuel cell vehicle control method according to claim 3, wherein
the HFR correction process includes:
comparing a vehicle speed of the fuel cell vehicle with a gearshift vehicle speed set as a vehicle speed during the gearshift operation, and
reducing the HFR value of the electrolyte membrane as a difference between the vehicle speed of the fuel cell vehicle and the gearshift vehicle speed decreases.

5. The fuel cell vehicle control method according to claim 3, wherein
the HFR value is reduced as a target gearshift time during the gearshift operation of the transmission increases in the HFR correction process.

6. The fuel cell vehicle control method according to claim 3, wherein
when output power of the fuel cell is higher than substantial absorbable power obtained by subtracting a maximum regenerative power of the drive motor from power suppliable to a load of the fuel cell other than the drive motor, the HFR correction process is executed by determining that transition to the upshift operation is predicted, or the upshift operation is being executed.

7. The fuel cell vehicle control method according to claim 3, wherein
a target value of the generated power of a torque phase of the upshift operation is set to an upper limit of allowable generable power which is an allowable upper limit value.

8. The fuel cell vehicle control method according to claim 7, wherein
when the HER value of the fuel cell is lower than a reference target value of the HFR value, the upper limit of allowable generable power is set as the target value of the generated power.

* * * * *